United States Patent [19]

Wada et al.

[11] Patent Number: 5,136,405
[45] Date of Patent: Aug. 4, 1992

[54] LIQUID CRYSTAL DISPLAY DEVICE WITH COMPENSATOR HAVING ΔNXD AND TWIST ANGLE CALCULATED USING THE LIQUID CRYSTAL'S PARAMETERS

[75] Inventors: Hiroshi Wada; Shinji Wada; Chiyoaki Iijima, all of Nagano, Japan

[73] Assignee: Seiko Epson Corporation, Tokyo, Japan

[21] Appl. No.: 454,619

[22] Filed: Dec. 21, 1989

Related U.S. Application Data

[63] Continuation-in-part of Ser. No. 345,048, Apr. 28, 1989, Pat. No. 4,909,606, which is a continuation of Ser. No. 52,816, May 19, 1987, Pat. No. 4,844,569.

[30] Foreign Application Priority Data

| May 19, 1986 | [JP] | Japan | 61-114299 |
| Jul. 22, 1986 | [JP] | Japan | 61-172142 |
| Jul. 22, 1986 | [JP] | Japan | 61-172143 |
| Jul. 22, 1986 | [JP] | Japan | 61-172144 |
| Dec. 19, 1986 | [JP] | Japan | 61-303168 |

[51] Int. Cl.$^5$ .................. G02F 1/133; G02F 1/1335
[52] U.S. Cl. ................................. 359/53; 359/73
[58] Field of Search ............ 350/335, 347 E, 347 R

[56] References Cited

U.S. PATENT DOCUMENTS

| 3,923,379 | 12/1975 | Kumada | 350/387 |
| 4,099,855 | 7/1978 | Wisbey et al. | 350/335 |
| 4,232,948 | 11/1980 | Shanks | 350/347 R |
| 4,443,065 | 4/1984 | Funada et al. | 350/335 |
| 4,492,433 | 1/1985 | Imaya et al. | 350/339 R |
| 4,548,479 | 10/1985 | Yeh | 350/404 |
| 4,653,861 | 3/1987 | Kando et al. | 350/337 |
| 4,664,482 | 5/1987 | Kando et al. | 350/347 E |
| 4,701,028 | 10/1987 | Clerc et al. | 350/337 |
| 4,715,686 | 12/1987 | Iwashita et al. | 350/337 |
| 4,844,569 | 7/1989 | Wada et al. | 350/347 E |
| 4,904,058 | 2/1990 | Kato et al. | 350/335 |
| 4,906,073 | 3/1990 | Hunahata et al. | 350/335 |
| 4,909,606 | 3/1990 | Wada et al. | 350/335 |
| 4,941,737 | 7/1990 | Kimura | 350/335 |
| 4,952,029 | 8/1990 | Hayashi et al. | 350/335 |

FOREIGN PATENT DOCUMENTS

| 0107160 | 5/1984 | European Pat. Off. |
| 3431871 | 3/1985 | Fed. Rep. of Germany |
| 2564605 | 11/1985 | France |
| 60-50511 | 3/1985 | Japan |
| 2145837 | 4/1985 | United Kingdom |

OTHER PUBLICATIONS

H. A. Tarry, "Electrically Tunable Narrowband Optical Filter" *Electronics Letter*, vol. II, No. 19, Sep. 18, 1975, pp. 471–472.

*Primary Examiner*—Stanley D. Miller
*Assistant Examiner*—Anita Pellman Gross
*Attorney, Agent, or Firm*—Blum Kaplan

[57] ABSTRACT

A liquid crystal display device includes a first twisted nematic liquid crystal cell and an optically anisotropic material sandwiched between two polarizers. A second twisted nematic liquid crystal cell or polymer film serves as the optically anisotropic material. The optically anisotropic material may be disposed on one or both sides of the first twisted nematic liquid crystal. The optically anisotropic material compensates for the elliptical polarization of the light passing through the liquid crystal cell so that the device transmits white light in the OFF state and appears black in the ON state.

14 Claims, 26 Drawing Sheets

FIG. 8
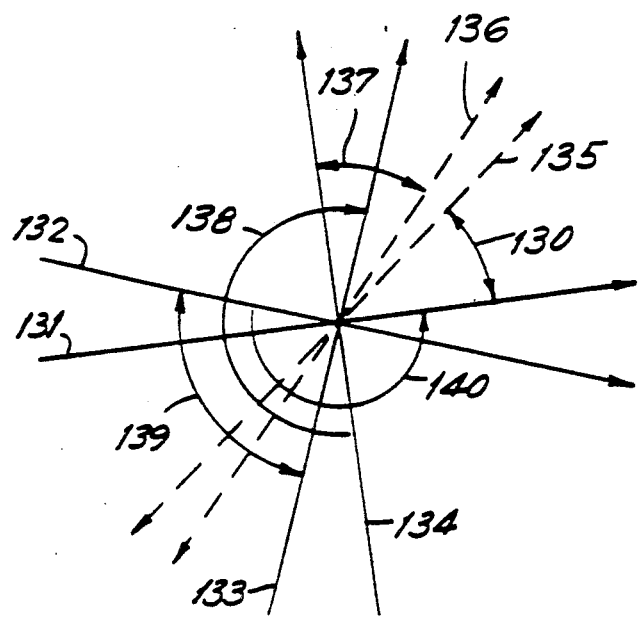
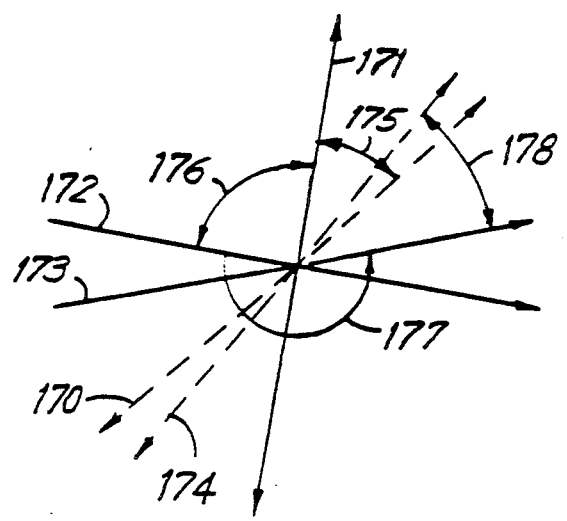
FIG. 13

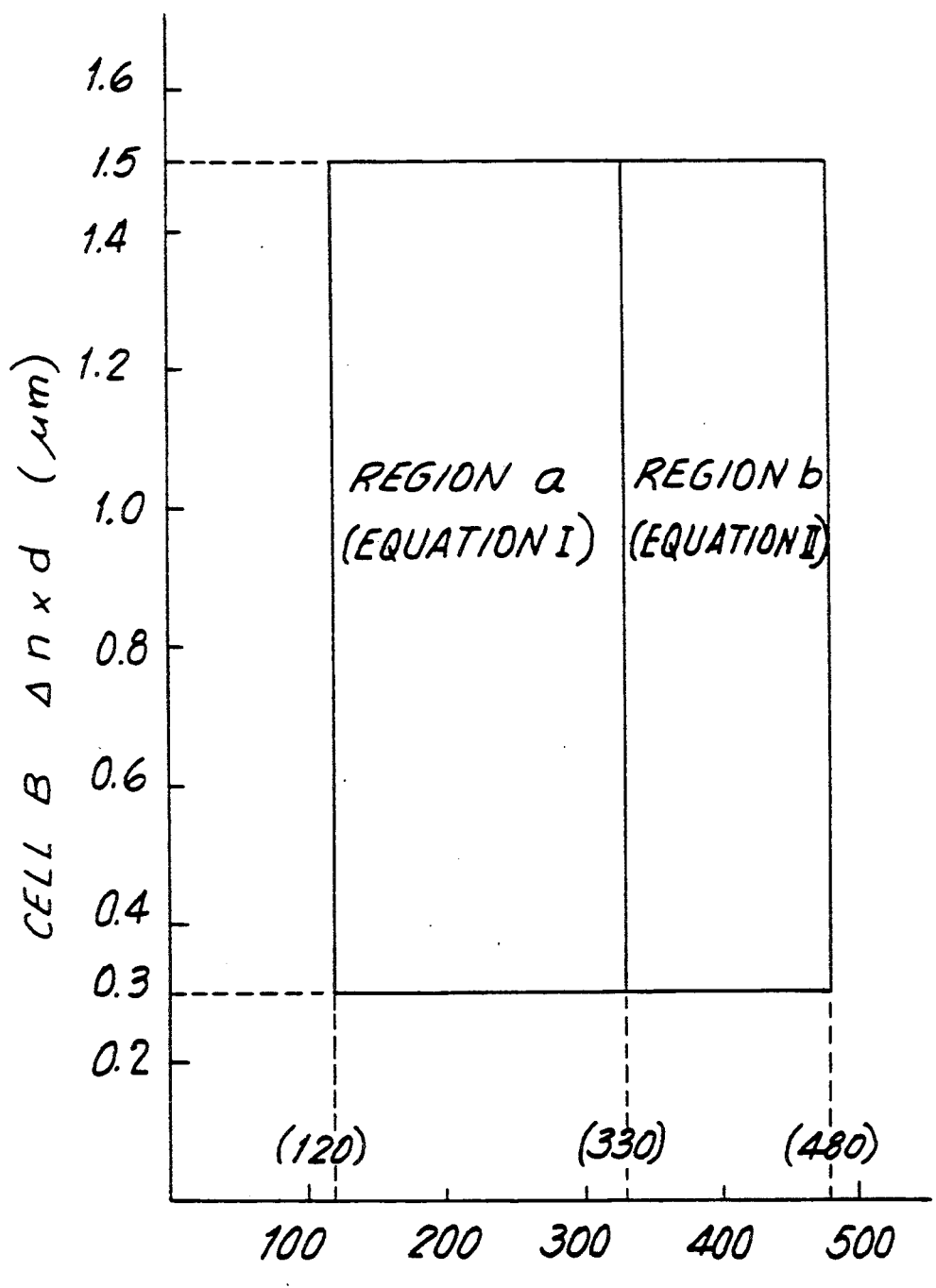

LIQUID CRYSTAL DISPLAY DEVICE WITH COMPENSATOR HAVING ΔNXD AND TWIST ANGLE CALCULATED USING THE LIQUID CRYSTAL'S PARAMETERS

CROSS-REFERENCE TO RELATED APPLICATION

This application is a continuation-in-part of U.S. patent application Ser. No. 07/345,048, filed on Apr. 28, 1989, which has issued at U.S. Pat. No. 4,909,606 on Mar. 20, 1990, which is a continuation of U.S. patent application Ser. No. 07/052,816, filed on May 19, 1987, which has issued as U.S. Pat. No. 4,844,569.

BACKGROUND OF THE INVENTION

This invention relates generally to a liquid crystal display device and method of fabrication, and especially to a liquid crystal display device having improved contrast between white and black by including an anisotropic material between the polarizers of the device.

Super twisted nematic liquid crystal display devices, such as disclosed in Japan-Laid Open No. 60-50511, include a liquid crystal cell with electrode substrates having rubbing directions at an angle greater than 90°. A pair of polarizers surround the cell with the polarizing axis (absorption axis) of each polarizer forming an angle between 30° and 60° relative to the rubbing direction of the adjacent substrate. The resulting birefringence causes white light passing through the device to be displayed as a green to reddish yellow color rather than white and as a bluish color rather than black when the device is turned off and on, respectively.

In summary, in a positive type display, white light tends to be displayed as green, yellowish green, yellow or reddish yellow when the device is turned off and blue or dark blue when the device is turned on. Similarly, white light passing through a negative type display device will be displayed as blue or dark blue when turned off and yellow when the device is turned on. In other words, prior art liquid crystal display devices are unable to display monochromatic black and white from white incident light. This inability is especially significant in the production of full color displays. Unfortunately, these prior art liquid crystal display devices also produce red and blue colored light with a lesser degree of brightness than green colored light resulting in unacceptable color performance.

Accordingly, it would be desirable to produce a liquid crystal display device which can overcome these problems associated with prior art devices.

SUMMARY OF THE INVENTION

In accordance with the invention, a liquid crystal display device includes a twisted nematic liquid crystal cell and at least one optically anisotropic material. The liquid crystal cell and optically anisotropic material are each characterized by parameters including a twist angle and the product of refractive index anisotropy Δn and layer thickness d. Based on the twist angle and product of Δn×d for the liquid crystal cell and twist angle of the optically anisotropic material, the product Δn×d of the optically anistropic material can be determined.

The twisted nematic liquid crystal cell produces a colored display in response to application of a voltage from a voltage source across the liquid crystal material. The optically anisotropic material compensates for color of the display. A nematic liquid crystal cell can serve as the optically anisotropic material. Twist angles of greater than approximately 90° are defined herein as super twisted liquid crystal material.

The device further includes a pair of linear polarizers with one polarizer disposed adjacent to the liquid crystal cell and the second of the polarizers disposed adjacent to the optically anisotropic material. Incident linearly polarized light passes through the first polarizer, is double refracted by the liquid crystal cell and enters the optically anisotropic material as elliptically polarized light which is converted back to linearly polarized light by the optically anisotropic material.

Accordingly, it is an object of this invention to provide an improved liquid crystal display device which produces monochromatic black and monochromatic white.

It is another object of the invention to display red and blue colored light as brightly as green colored light and thus improve the color performance of the liquid crystal display device.

It is yet another object of the invention to provide monochromatic black and monochromatic white from a liquid crystal display device whether or not the device is of the positive or negative type.

Still other objects and advantages of the invention will, in part, be obvious and will, in part, be apparent from the specification.

The invention accordingly comprises a article of manufacture possessing the features, properties and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 8 diagrammatically illustrates the direction of the various axes and rubbing directions of the device of FIG. 7;

FIG. 13 diagrammatically illustrates the direction of the various axes and rubbing directions of the device of FIG. 12;

FIG. 37 is a plot of birefrigence ($\Delta n$) times thickness (d) versus twist angle of the liquid crystal display cell segregated into two regions for determining the product of birefringence ($\Delta n$) and thickness (d) of the optically anisotropic material.

DESCRIPTION OF THE PREFERRED EMBODIMENTS

Figure 1:
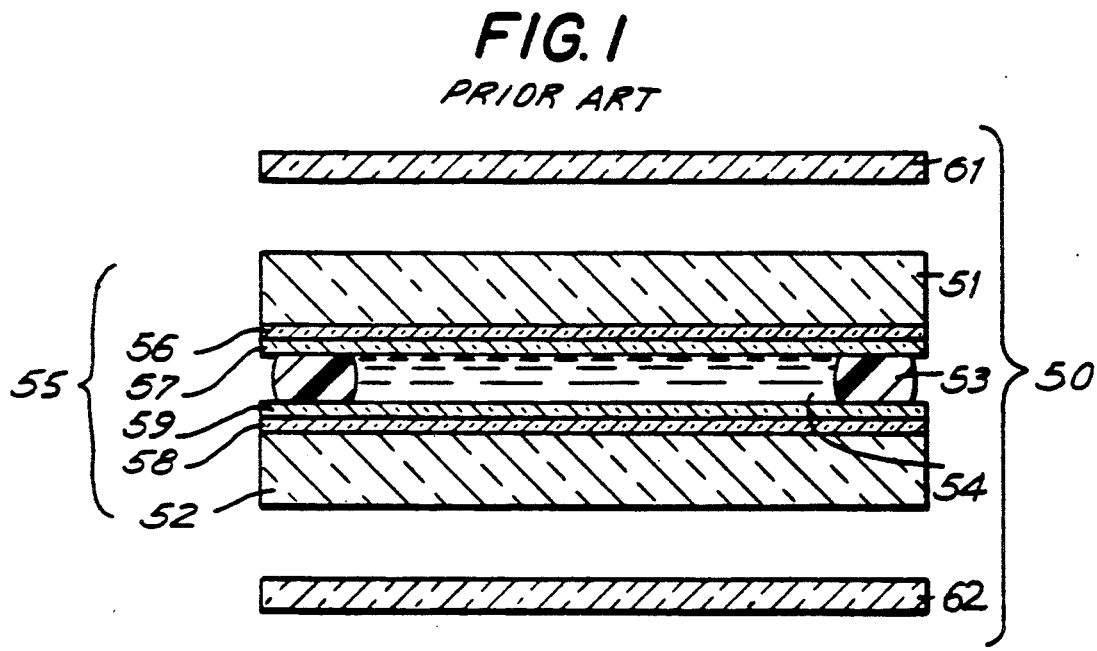
FIG. 1 is a partially exploded cross-sectional view of a conventional liquid crystal display device.

A prior art super twisted nematic liquid crystal display device 50 including a liquid crystal display cell 55 is shown in FIG. 1. Device 50 includes a first upper transparent substrate 51 and a cooperating second lower transparent substrate 52 spaced apart by a spacer 53 to form a space. A twisted nematic liquid crystal material 54 is placed in the space. A first transparent electrode 56 is deposited selectively on upper substrate 51 and an orientation film 57 is disposed thereon. Similarly, a cooperating second transparent electrode 58 is deposited on lower substrate 52 and an orientation film 59 is deposited thereon. An upper polarizer 61 is disposed on the exterior surface of upper substrate 61 and a lower polarizer 62 is disposed on the exterior surface of lower substrate 52.

Transparent electrodes 56 and 58 are typically energized based on applied voltage having, for example, but not limited to, a 1/100th duty cycle ratio. All liquid crystal display cells defined herein are considered turned OFF when no voltage is supplied to the electrodes or when the voltage applied to the electrodes results in no or an insignificant change in the orientation of the molecules within the liquid crystal material. Additionally, all liquid crystal display cells are considered to be turned ON when the voltage applied to the electrodes is sufficient to cause a change in the orientation of the molecules of the liquid crystal material. Therefore, the optical path of light transmitted through a liquid crystal display cell changes when the cell is turned ON compared to when the cell is turned OFF. For illustrative purposes only, the OFF and ON states of device 50 occur when device 50 is transmitting substantially all or very little of the light passing therethrough, respectively.

Figure 2:
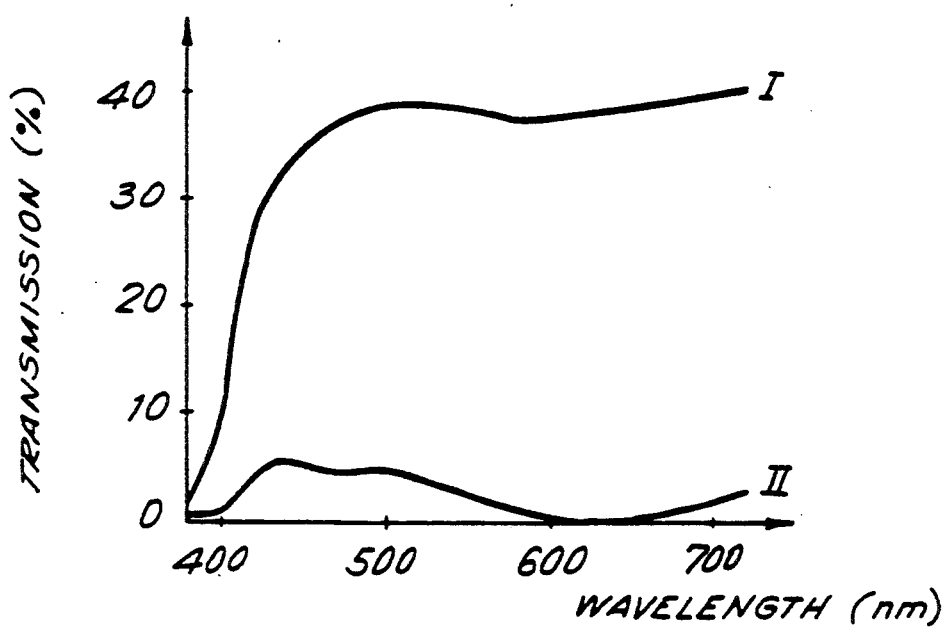
FIG. 2 is a plot of the light transmittance spectrum of a prior art polarizer shown in FIG. 1.

Linear polarizers 61 and 62 a re commercially available from Sanritsu Electronics Company as Part No. LLC2 82-18. A typical transmission spectrum of linear polarizers 61 and 62 is shown in FIG. 2. Curve I represents the parallel state, that is, where the absorption directions of polarizers 61 and 62 are oriented parallel to each other. Curve II represents the cross nicol state, that is, when the absorption directions of polarizers 61 and 62 are oriented perpendicular to each other.

Orientation films 57 and 59 are rubbed to cause an alignment of the liquid crystal material which is adjacent thereto. When assembled, the films 57 and 59 are twisted relative to one another to twist the liquid crystal selectively between the upper and lower films (hereinafter referred to as the twist angle). Device 50 can be a positive or negative type display.

Figure 3:
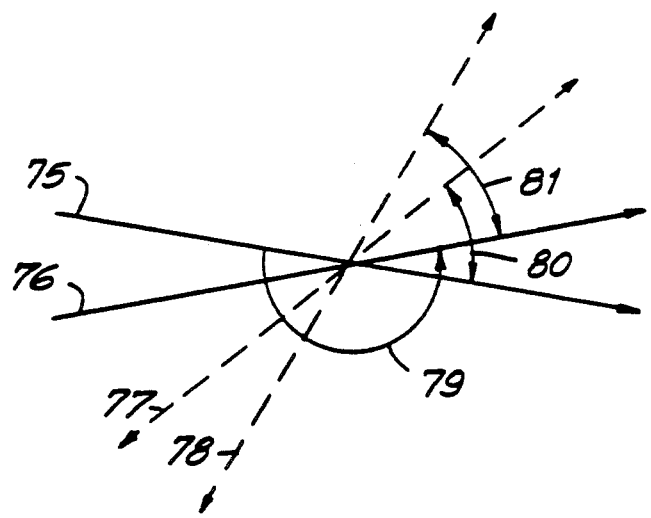
FIG. 3 diagrammatically illustrates various axial and rubbing directions of the device of FIG. 1.

FIG. 3 illustrates the relative directions of the axes and orientations of device 50. The rubbing directions of orientation film 57 and orientation film 59 are denoted by reference numerals 75 and 76, respectively. The directions of the axes of polarization (absorption axes) of polarizers 61 and 62 are denoted by reference numerals 77 and 78, respectively. The twist angle of liquid crystal material 53 is denoted by reference numeral 79. The angular difference between rubbing direction 75 of orientation film 57 and polarizing direction 77 of upper polarizer 61 is represented by an angle 80. The angular difference between rubbing direction 76 of orientation film 59 and polarizing axis 78 of lower polarizer 62 is represented by an angle 81. As will now be explained, these angular relationships prevent these prior art liquid crystal display devices from being able to display monochromatic black and monochromatic white.

Figure 4:
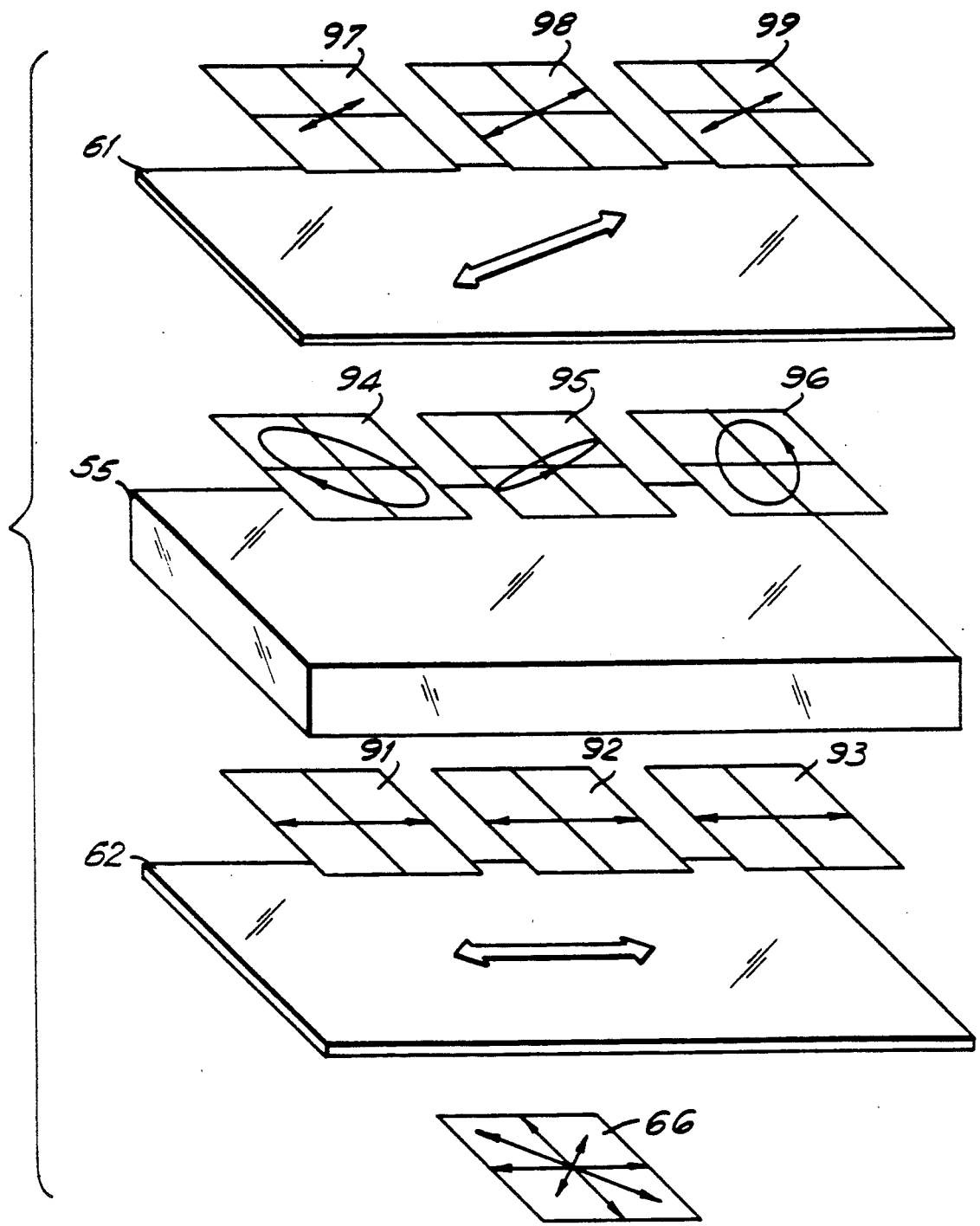
FIG. 4 is a diagrammatic exploded perspective view of the device of FIG. 1 illustrating the optical paths of light transmitted through the device.

FIG. 4 illustrates the optical path of light travelling through the device 50 in the OFF state. More specifically, incident light 66, such as natural light containing all wavelengths within the visible region, passes through lower linear polarizer 62 resulting in a set of linearly polarized light 91, 92 and 93 having wavelengths at 450 nm, 550 nm and 650 nm, respectively. Linearly polarized light 91, 92 and 93 illustrate wavelengths of blue, green and red colored light. Of course, a plurality of light of other wavelengths are also transmitted through and linearly polarized by lower polarizer 62. For illustrative purposes only polarized light 91, 92 and 93 will be examined herein.

When linearly polarized light 91, 92 and 93 pass through cell 55 including liquid crystal material 54, the optical directions change due to the twisted orientation of the optically uniaxial anisotropic liquid crystal material 54 in cell 55. Consequently, linearly polarized light 91, 92 and 93 upon passing through cell 55 become elliptically polarized light 94, 95 and 96, respectively. Due to the difference in wavelength, the red, green and blue become elliptically polarized in different directions.

After passing through upper linear polarizer 61, elliptically polarized light 94, 95 and 96 becomes linearly polarized light 97, 98 and 99. Only that component of the elliptically polarized light 94, 95 and 96 in the direction of the axis of polarization of linear polarizer 61 can pass through. Consequently, the intensity of light 98 of the green wavelength (550 nm) is of greater intensity than light 97 of the blue wavelength (450 nm) and light 99 of the red wavelength (650 nm). The difference in intensities is most pronounced for super twisted nematic liquid crystal devices. Furthermore, the resulting light transmitted by device 50 from natural white light 66 is a greenish, yellowish green, yellow or reddish yellow rather than white. The colored appearance rather than the desired white displayed by device 50 is due in part to the optical anisotropy of the twisted nematic liquid crystal material and is characterized by its birefringence. Still further, with device 50 turned ON, rather than having no light transmitted through device 50 a bluish color is displayed.

Figure 5:
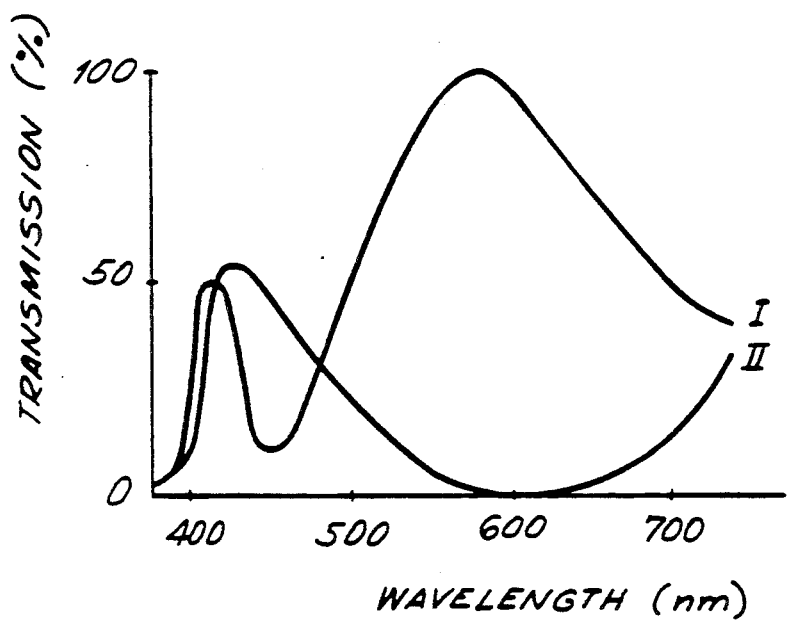
FIG. 5 is a plot of the light transmittance spectrum of the device of FIG. 1.
Figure 6:
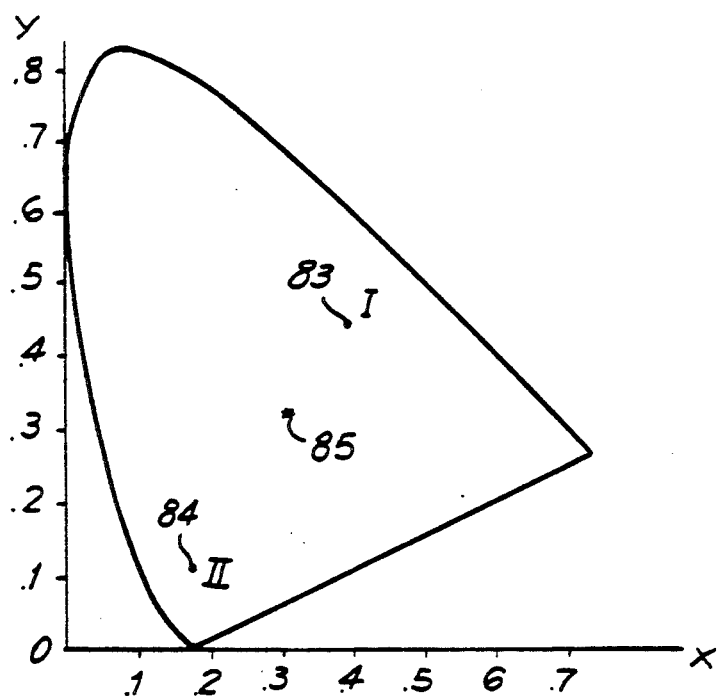
FIG. 6 is a chromaticity diagram (1931 CIE) plotting curves I and II shown in FIG. 5.

The foregoing problems of prior art liquid crystal display devices as typified by device 50 are graphically illustrated in FIGS. 5 and 6 wherein twist angle 79 is about 200° (i.e., super twisted nematic) and angles 80 and 81 are each about 50°. Additionally, the birefringence ($\Delta n$) and the layer thickness (d) of twisted nematic liquid crystal material 54 when multiplied ($\Delta n \times d$) is about 0.9 $\mu$m. A plurality of pixels of device 50 may be driven by conventional XY matrix multiplex driving wherein the multiplex driving voltage has, but not limited to, a 1/100th duty cycle ratio. For example, curve I of FIG. 5, which represents the OFF state of device 50, peaks near the green wavelength of 550 nm rather than having a substantially flat, straight line at 100% transmission throughout the visible wavelength region. Similarly, rather than having a substantially flat line at 0% transmission, curve II peaks near the bluish wavelength of approximately 450 nm. As shown in FIG. 6, the chromaticity diagram (1931 CIE) plots curves I and II of FIG. 5 as points 83 and 84, respectively. White light is represented by reference numeral 85.

Figure 7:
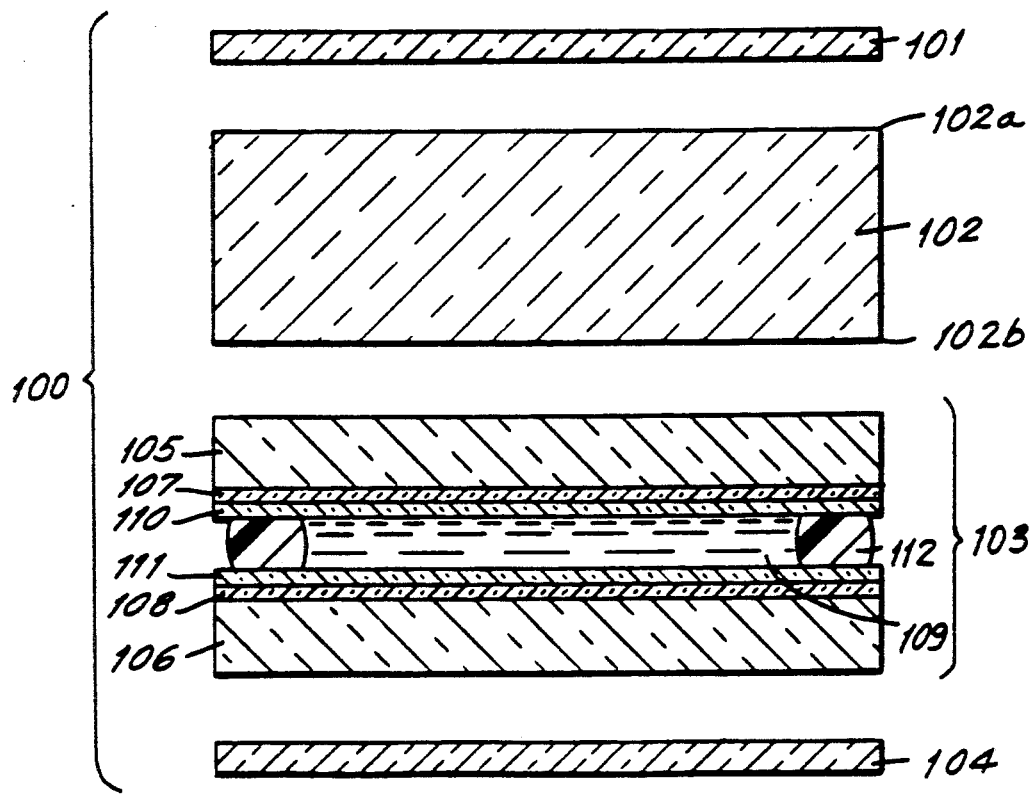
FIG. 7 is a partially exploded cross-sectional view of a liquid crystal display device in accordance with one embodiment of the invention.

A liquid crystal display device 100 constructed in accordance with the invention as shown in FIG. 7 overcomes these drawbacks of the prior art devices. Device 100 includes an upper linear polarizer 101 and a lower polarizer 104 and an optically anisotropic layer 102 and a twisted nematic liquid crystal cell 103 disposed between polarizers 101 and 104. Cell 103 includes a twisted nematic liquid crystal material 109 disposed between an upper substrate 105 and a lower substrate 106 with transparent electrodes 107 and 108 disposed thereon. Orientation films 111 and 110 are deposited on electrodes 106 and 107, respectively. A spacer 112 serves to hold substrates 105 and 106 apart and liquid crystal material 102 therebetween. Apart from optically anisotropic layer 102, device 100 is similar to device 50 of FIG. 1. Optically anisotropic layer 102 having an upper surface 102a and a lower surface 102b is disposed between polarizer 101 and upper substrate 105 of liquid crystal cell 103.

The optical relationship between polarizers 101 and 104, optically anisotropic layer 102 and cell 103 is shown in FIG. 8. More specifically, the rubbing directions of lower orientation film 107 and upper orientation film 108 are denoted by reference numerals 131 and 132, respectively. The optical axes of surfaces 102a and 102b of optically anisotropic layer 102 are denoted by reference numerals 133 and 134, respectively. The polarizing axes (absorption axes) of linear polarizers 101 and 104 are denoted by reference numerals 135 and 136, respectively. The angle formed between polarizing axis 136 and optical axis 134 is denoted by reference numeral 137. The angle formed between optical axes 133 and 134 is denoted by reference numeral 138. The angle formed between optical axis 133 of lower surface 102b of optically anisotropic layer 102 and rubbing direction 132 of orientation film 107a is denoted by reference numeral 139. The twist angle formed by rubbing directions 132 and 131 of liquid crystal material 102 is denoted by reference numeral 140. The angle formed between rubbing direction 131 of orientation film 107b and polarizing axis 135 of lower polarizer 104 is denoted by reference numeral 130. As will be discussed in more detail below, the relationship between these angles, especially those angles associated with optically anisotropic substance 102, enable device 100 to produce monochromatic white and black and provide improved contrast.

Figure 9:
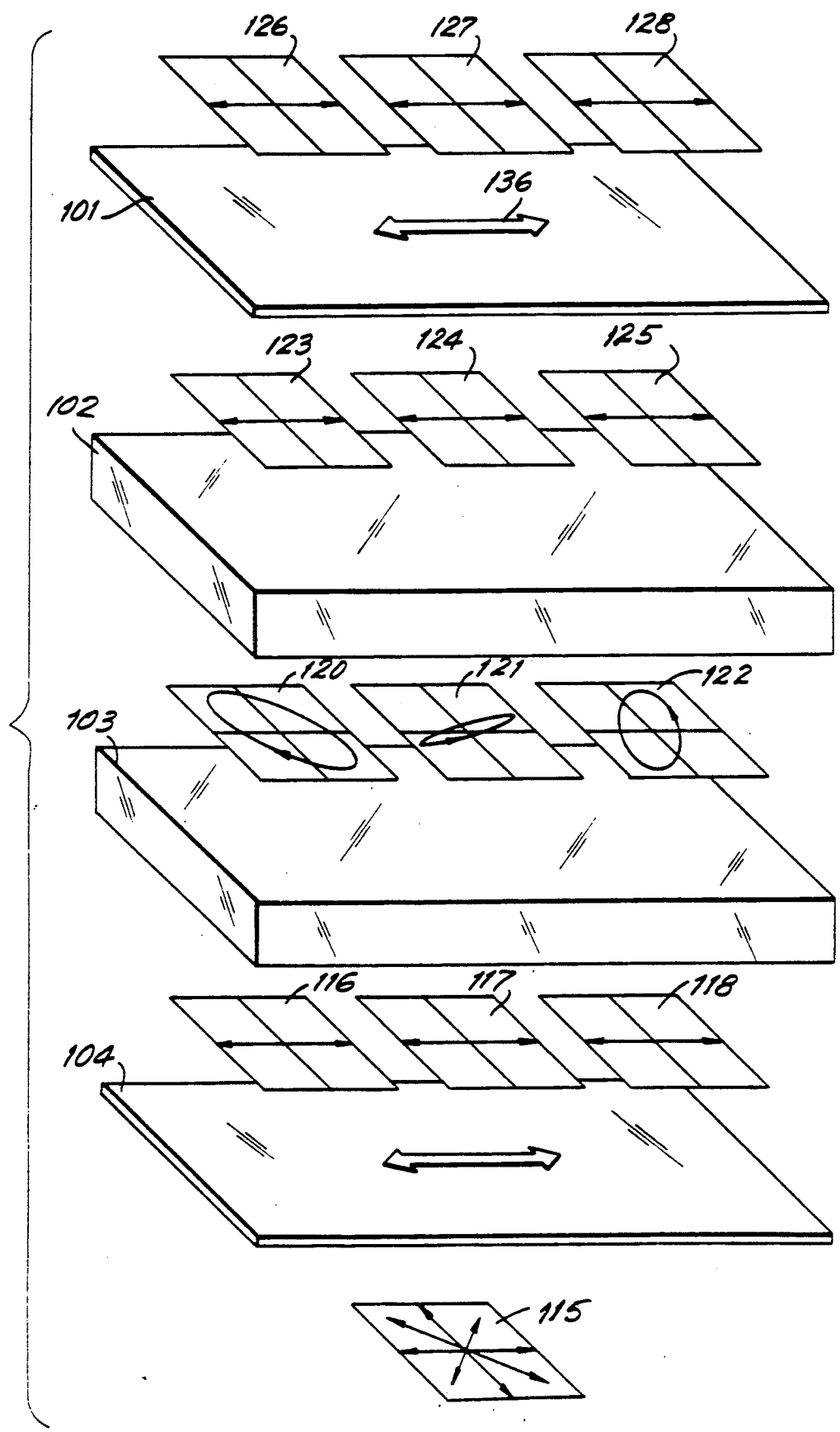
FIG. 9 is a diagrammatic exploded perspective view of the device of FIG. 7 illustrating the optical paths of light transmitted through the device.

As shown in FIG. 9, which is substantially similar to FIG. 4 except for the addition of optically anisotropic layer 102, incident light 115 passes through lower linear polarizer 104 producing linear polarized light which for illustrative purposes only is represented by light having blue, green and red wavelengths 116, 117 and 118, respectively. Upon passing through cell 103, light 116, 117 and 118 of the red, green and blue wavelengths become elliptically polarized light 120, 121 and 122, respectively. Optically anisotropic layer 102 rotates light 120, 121 and 122 having the elliptically polarized waves to cancel the differences between their polarized states by again linearly polarizing all wavelengths as represented by light 123 of the blue wavelength, light 124 of the green wavelength and light 125 of the red wavelength. Since linearly polarized light 123, 124 and 125 all have the same direction as the polarizing axis of polarizer 101, light 123, 124 and 125 passes through polarizer 101 without loss of brightness or intensity as represented by light 126, 127 and 128.

By providing an optically anisotropic substance 102 which compensates for the elliptical polarization of light passing through cell 103, the intensity of light 123, 124 and 125 passing through optically anisotropic layer 102 are substantially the same as the light entering cell 103, namely linear polarized light 116, 117 and 118. In sum, the light entering cell 103 and transmitted by optically anisotropic layer 102 is linearly polarized and has the same polarizing direction. It should also be noted that if the direction of polarizing axis 136 of upper polarizer 101 and the direction of linearly polarized light 123, 124 and 125 transmitted by optically anisotropic layer 102 are the same, linearly polarized light 123, 124 and 125 transmitted by layer 102 will pass through polarizer 101 in accordance with the transmission spectrum of FIG. 2 wherein light of the blue, green and red wavelengths will have the same degree of brightness. Disregarding the absorption and reflectance of cell 103 and substance 102, the brightness of light entering cell 103 and transmitted by layer 102 will be identical.

Figure 10:
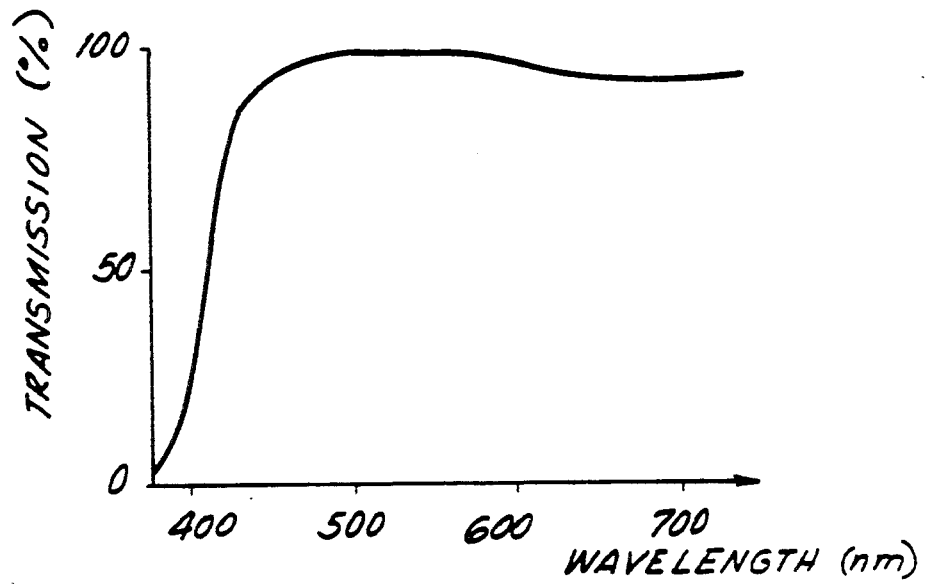
FIG. 10 is a plot of the light transmittance spectrum of the device of FIG. 7.
Figure 11:
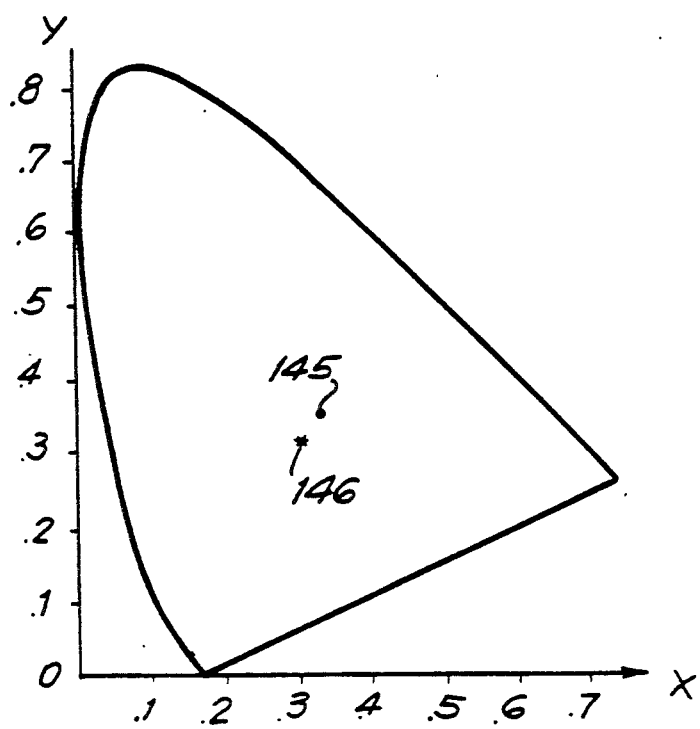
FIG. 11 is a chromaticity diagram (1931 CIE) of the curve of FIG. 10.

FIG. 10 illustrates the transmission spectrum with approximately 100% for all visible wavelengths when device 100 is turned OFF. Device 100 has angle 130 of about 45°, angle 137 of about 45°, angle 138 of about 200° to the right, angle 139 of about 90°, angle 140 of about 200° to the left, $\Delta n \times d$ of cell 103 of about 0.9 μm and a $\Delta n \times d$ of optically anisotropic substance 102 of about 0.9 μm. In other words, FIG. 10 demonstrates the ability of liquid crystal display device 100 to produce monochromatic white light. The chromaticity diagram (1931 CIE) for the transmission spectrum of FIG. 10 is shown in FIG. 11 with the curve represented by a point 146 and the point of pure white represented by a point 145.

It has been found that optically anisotropic layer 102 will cancel the elliptical effect on the polarized light emitted by liquid crystal cell 103 when the following three conditions are met:

(1) that the product of birefringence ($\Delta n$) and layer thickness (d) that is, $\Delta n \times d$ for both cell 103 and substance 102 is the same;

(2) that the twist angle 140 of cell 103 and the twist angle formed between optical axes 133 and 134 of substance 102 must have the same magnitude but opposite helical sense (directions); and (3) angle 139 between optical axis 133 of surface 102b and rubbing direction 132 of orientation film 107 is about 90°.

Figure 12:
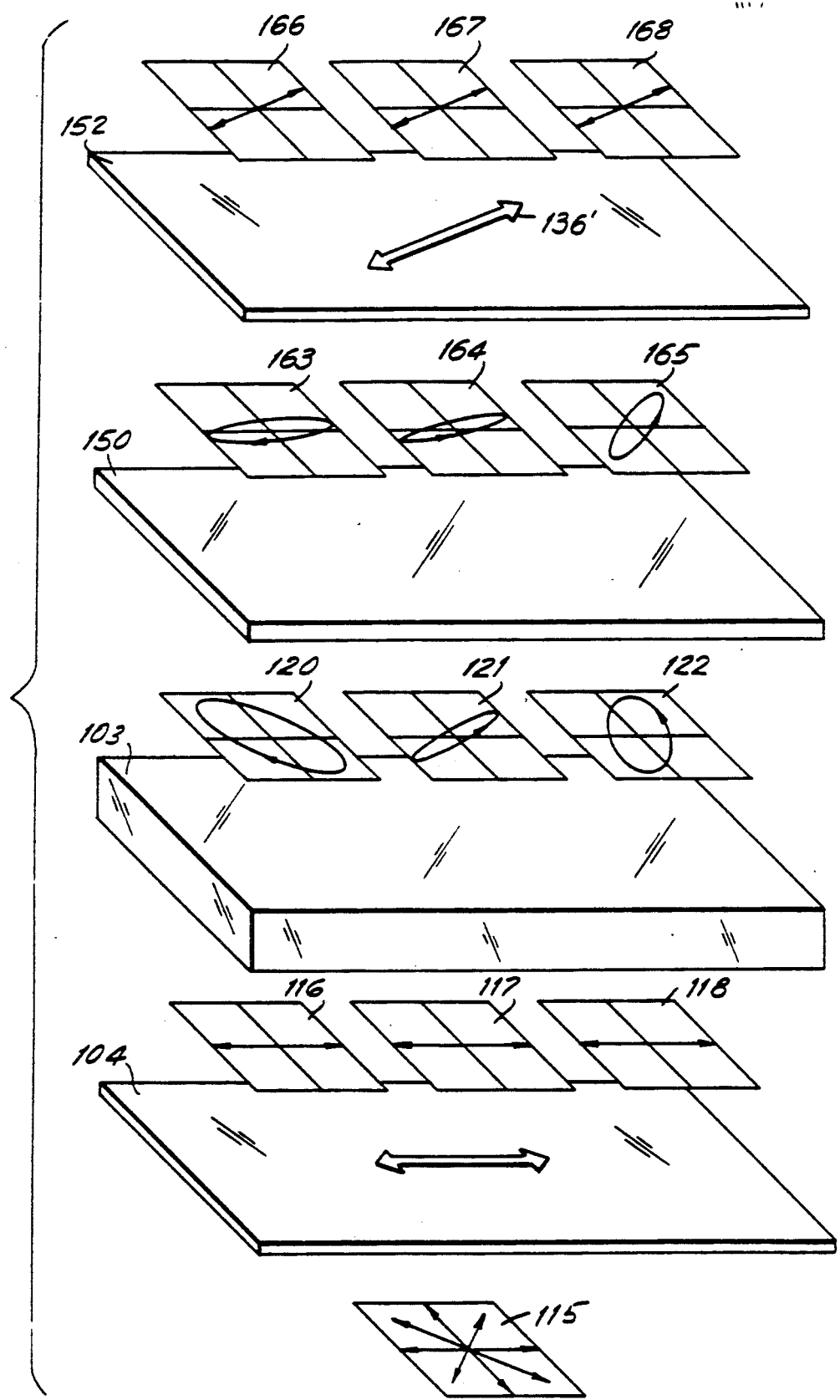
FIG. 12 is a diagrammatic exploded perspective view of a liquid crystal display device similar to FIG. 8 in accordance with an alternative embodiment of the invention.
Figure 14:
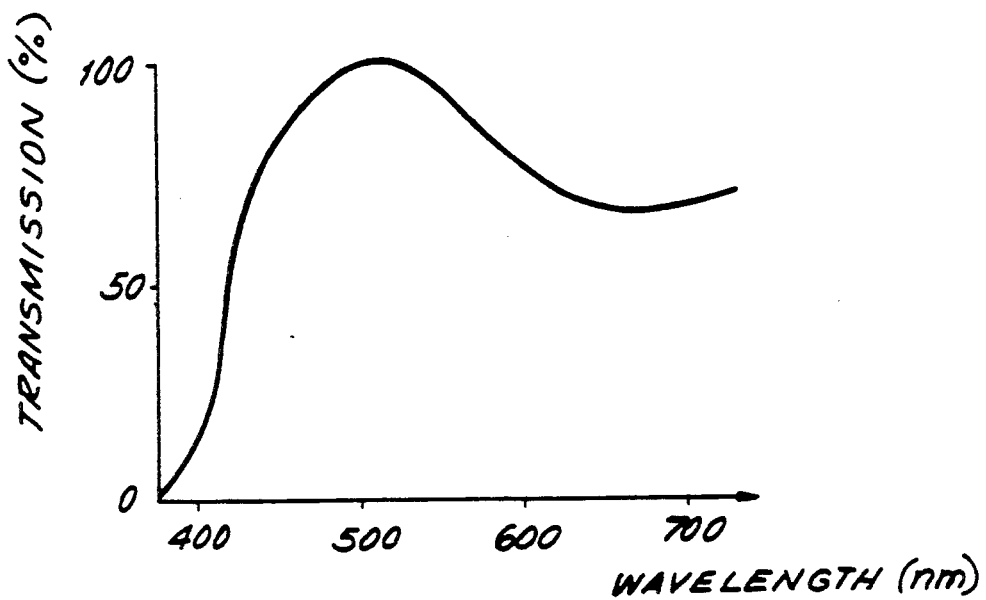
FIG. 14 is a plot of the light transmittance spectrum of the device of FIG. 12.
Figure 15:
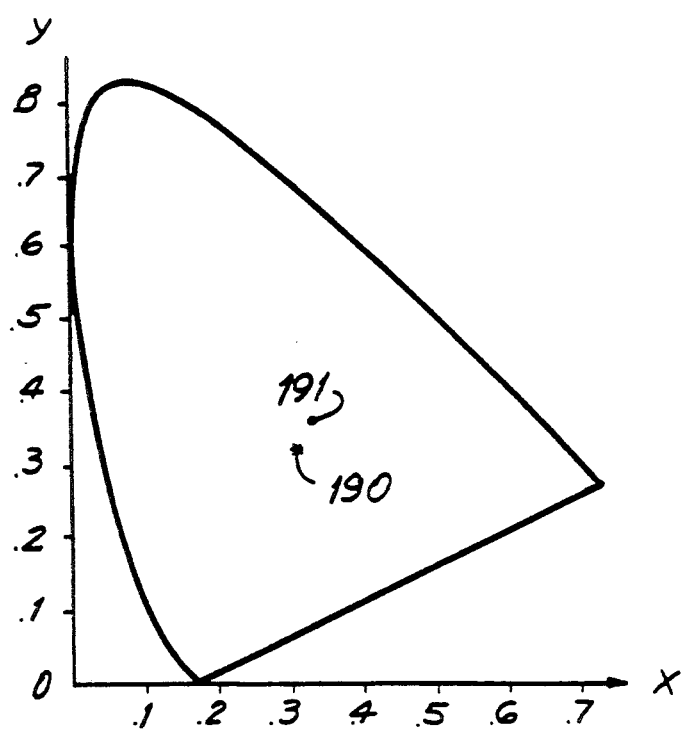
FIG. 15 is a chromaticity diagram (1931 CIE) of the curve plotted in FIG. 14.

These three conditions, however, need not always be satisfied in order to produce substantially white light or no light leakage when the device is turned OFF and ON, respectively. More particularly, as shown in FIG. 12, an optically anisotropic layer 150 having a $\Delta n \times d$ different than $\Delta n \times d$ of cell 103 can also transmit light which is no elliptically polarized. Although light of wavelengths 163, 164 and 165 representative of the blue, green and red wavelengths are slightly elliptically polarized and thus have components which are not in the same direction as polarizing axis 136' of an upper polarizer 152 the transmission spectrum shown in FIG. 14 and corresponding chromaticity diagram of FIG. 15 demonstrate that almost a pure white light can be obtained. In referring to FIG. 15, the transmission curve of FIG. 14 is represented by a point 191 whereas pure white light is represented by a point 190. Under such circumstances, the light transmitted by polarizer 152 of FIG. 12 as represented by light 166 of the blue wavelength, light 167 of the green wavelength and light 168 of the red wavelength has an intensity which is slightly dependent upon wavelength.

As a practical matter, it is preferable that these three conditions not be met a commercially available polarizers (as represented by the transmission spectrum of FIG. 2) do not have substantially flat curves in the visible wavelength spectrum. In other words, due to the fact that commercially available polarizers are somewhat colored, it is preferable to choose an optically anisotropic layer which compensates for the coloring inherent in the polarizers in order for the liquid crystal display device to transmit monochromatic white and black light. Additionally, under certain circumstances, it is also preferable not to have all three conditions met in order to accommodate a desired viewing angle for the liquid crystal display device.

As shown in FIG. 13, the axial and rubbing directions of a device in accordance with FIG. 12 are represented as follows: The directions of the polarizing (absorption) axes of polarizers 152 and 104 is denoted by reference numerals 170 and 174, respectively. The direction of the optical axis of optically anisotropic layer 150 is denoted by reference numeral 171. The rubbing direction of the electrode substrates of liquid crystal cell 103 nearest to layer 150 and lower polarizer 104 are denoted by reference numerals 172 and 173, respectively. The angles formed between polarizing axis 170 and optical axis 171 and between polarizing axis 174 and rubbing direction 173 are denoted by reference numerals 175 and 178, respectively. The angle formed between optical axis 171 and rubbing direction 172 is denoted by reference numeral 176. Finally, the twist angle of cell 103 formed between rubbing direction 172 and 173 is denoted by reference numeral 177.

In the description of the invention until now the incident light has first travelled through lower polarizer 104 and then through liquid crystal cell 103 before reaching optically anisotropic layer 102 or 150. The cancellation of the polarization effect of cell 103 by the optically anisotropic layer can be accomplished by disposing the optically anisotropic substance between polarizer 104 and liquid crystal cell 103. Furthermore, and as shown in FIG. 16, the optically anisotropic substance can be separated into two segments, one above and below liquid crystal cell 103.

Figure 16:
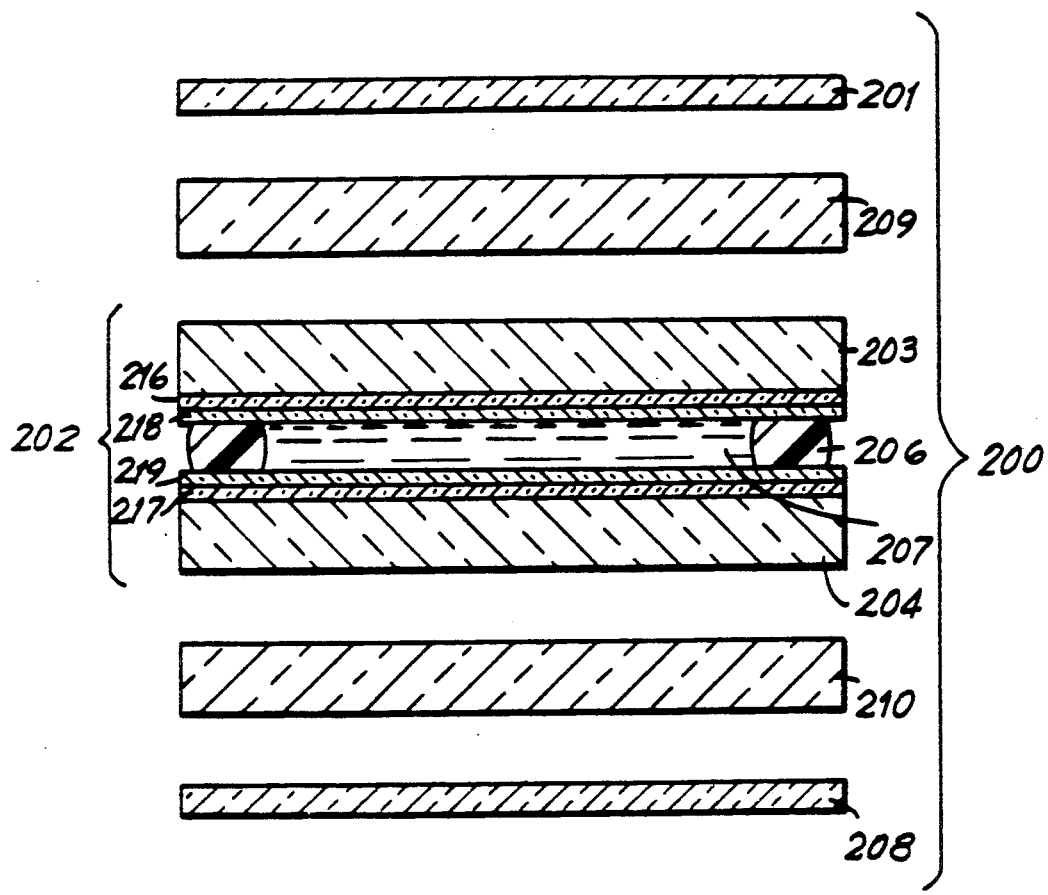
FIG. 16 is a partially exploded cross-sectional view of a liquid crystal display device in accordance with another alternative embodiment of the invention.

In FIG. 16, a liquid crystal display device 200 includes an upper linear polarizer 201 and a lower polarizer 208. An upper optically anisotropic layer 209 and a lower optically anisotropic layer 210 are positioned adjacent to polarizers 201 and 210 on both sides of a liquid crystal display cell 202. Liquid crystal cell 202 includes a liquid crystal material 207 sandwiched between an upper substrate 203 having electrodes 216 thereon and a lower substrate 204 having electrodes 217 thereon. Orientation films 218 and 219 are disposed on substrates 203 and 204, respectively.

Device 200 operates in a similar manner to device 100 and differs only in that optically anisotropic layers 209 and 210 are on either side of liquid crystal cell 202 rather than on only one side of liquid crystal cell 103 as in device 100. The resulting optical effects of optically anisotropic layers 209 and 210 of device 200 function in the same manner as optically anisotropic layer 102 of device 100 to cancel the elliptically polarizing effect of liquid crystal cell 102.

When device 100 or 200 is turned ON, there is none or very little light passing through upper polarizers 101, 152 and 201 which are other than perpendicular to the axes of polarization of these polarizers. Accordingly, very little if any light is transmitted through polarizers 101, 152 and 201 resulting in a transmission curve denoted by curve II of FIG. 2.

In order to determine the condition of light polarized passing through an optically anisotropic material, the polarized light (E) ca be broken into X and Y components of vibrations as follows:

$$E = \begin{bmatrix} a_x\, e^{i(wt+\phi x)} \\ a_y\, e^{i(wt+\phi y)} \end{bmatrix} \quad (\text{eq 1})$$

wherein: $a_x$ and $a_y$ represent the amplitudes of the x and y components, respectively; wt is angular frequency; and $\phi_x$ and $\phi_y$ are the phase angles of the x and y components, respectively. The x and y components of the polarized light (E) as defined eq 1 can be transformed by using the normalized Jones vector and disregarding the angular frequencies since they have no relationship to the vibration at this time as follows:

$$E = \begin{bmatrix} \dfrac{a_x}{\sqrt{ax^2 + ay^2}}\, e^{-i\frac{\delta}{2}} \\ \dfrac{a_y}{\sqrt{ax^2 + ay^2}}\, e^{i\frac{\delta}{2}} \end{bmatrix} \quad (\text{eq 2})$$

wherein $\delta = (\phi y - \phi x)$

Polarized light E passing through optically anisotropic layer can be represented as polarized light E' by transforming polarized light E of eq 2 using a 2×2 Jones matrix representing the optically anisotropic layer. For example, where the optically anisotropic layer is a uniaxial linear retarder such as a polymer layer, the Jones matrix is represented as follows:

$$R_{\Delta,\theta} \begin{bmatrix} \cos^2\theta\, e^{i(\frac{\Delta}{2})} + \sin^2\theta\, e^{-i(\frac{\Delta}{2})} & 2i\sin\theta\cos\theta\sin\frac{\Delta}{2} \\ 2i\sin\theta\cos\theta\sin\frac{\Delta}{2} & \cos^2\theta\, e^{-i(\frac{\Delta}{2})} + \sin^2\theta\, e^{i(\frac{\Delta}{2})} \end{bmatrix} \quad (\text{eq 3})$$

wherein $\theta$ is an angle between the fast axis of the linear retarder and the x axis and $\Delta$ represents retardation which is defined as $\Delta = 2\pi\, \Delta n \times d / \lambda$. $\Delta n \times d$ is the product of the birefringence and layer thickness of the linear retarder and $\lambda$ represents the wavelength of light. The fast axis represents the vibrating direction of the linear polarizing component which passes through the linear retarder at a fast speed and has a quite small refractive index. Accordingly the condition of polarized light passing through the polymer layer which serves as the optically anisotropic layer can be represented as follows:

$$E' = R_{\Delta,\theta} E \quad (\text{eq 4})$$

Furthermore, when the optically anisotropic material is formed by laminating the polymer layers represented in Equation (4) can be represented as follows wherein the Jones matrix of Equation (3) is used for each polymer layer with the order of each Jones matrix representing each layer to the left of the incident light vector E in the same order as light passes through the layers:

$$E' = R_{\Delta n,\theta n} R_{\Delta n-1,\theta n-1} \cdots R_{\Delta 2,\theta 2} R_{\Delta 1,\theta 1} E \quad (\text{eq 5})$$

Figure 17A:
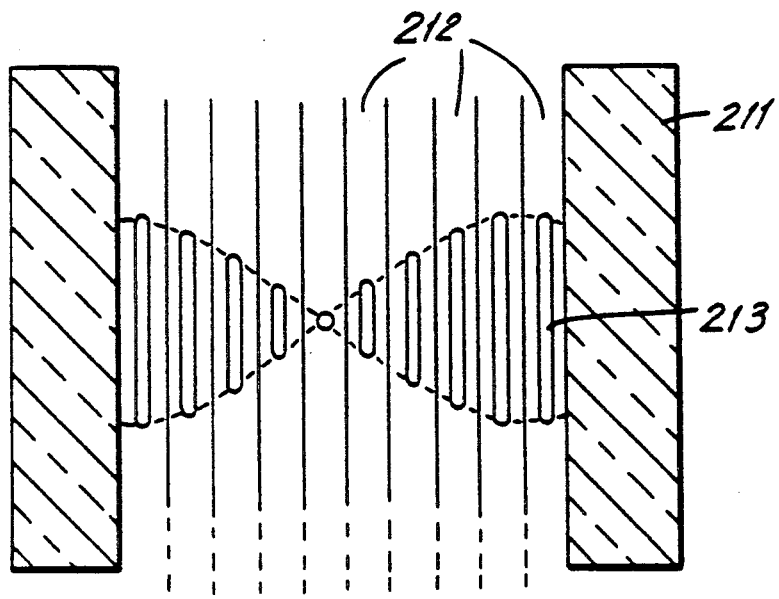
FIGS. 17(a) and (b) illustrate a cross-sectional view of a liquid crystal layer and a corresponding plot of twist angle versus thickness of the liquid crystal layer.
Figure 17B:
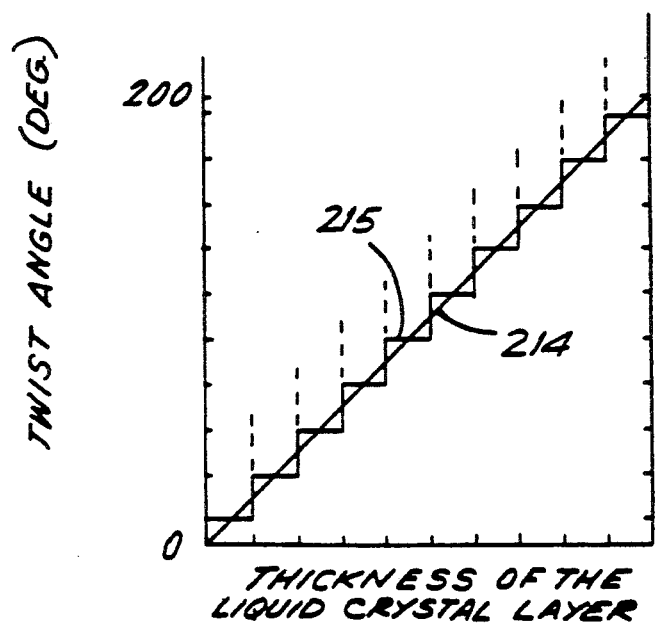

Equation 5 also can be used to determine the elliptically polarized light travelling through a liquid crystal layer rather than just laminated polymer layers by dividing the liquid crystal layer into a plurality of sublayers 212 between electrode substrates 211 wherein each sublayer 212 has all molecules 213 lying therein in the same direction, that is, with no twists angles 215 as shown in FIGS. 17(a) and (b). No matter how thick the liquid crystal may be, each sublayer 212 has all the molecules therein oriented at the same angle 215 with the sum of the sublayers 212 forming a total twist angle 214 which continuously varies depending upon which sublayer 212 is being examined. Therefore, each sublayer has the same axial direction and serves as a uniaxial linear retarder.

This can be illustrated for device 100 of FIG. 9. Device 100 has angles 130 and 137 of about 45°, angle 138 of about 200° to the right, angle 139 of about 90°, angle 140 of about 200° to the left and both optically anisotropic layer 102 and liquid crystal cell 103 with the product of their birefringence and layer thickness ($\Delta n \times d$) of about 0.9 μm can be analyzed using Equation 5 to determine the linearly polarized light transmitted by device 100. More specifically, both liquid crystal layer 109 and optically anisotropic layer 102 are each divided into 20 sublayers wherein each sublayer serves as a uniaxial linear retarder. Referring to FIGS. 18, 19 and 20 which represent the condition of light wavelengths at 450 nm, 550 nm and 650 nm, respectively, the direction of the light passing through every fifth sublayer of FIG. 17(a) is shown.

Figure 18A:
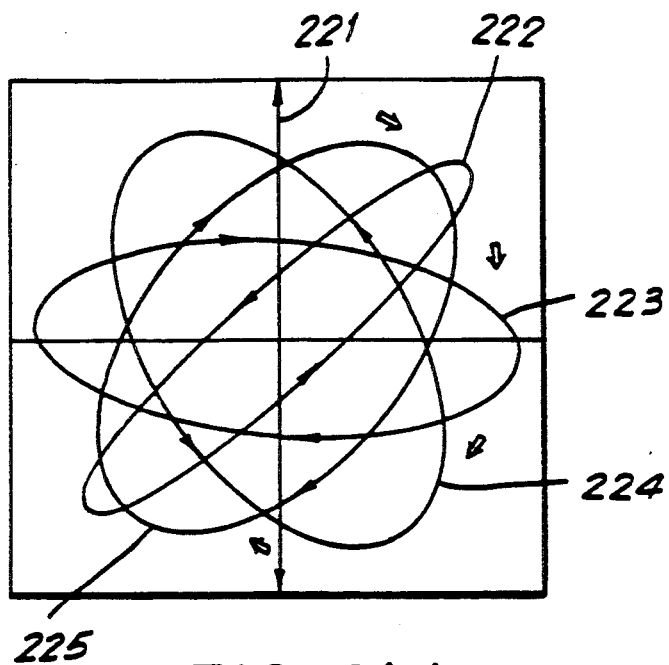
FIGS. 18(a) and (b) illustrate the optical paths travelled by polarized light having a wavelength of 450 nm passing through a twisted nematic liquid crystal cell and an optically anisotropic substance, respectively.
Figure 18B:
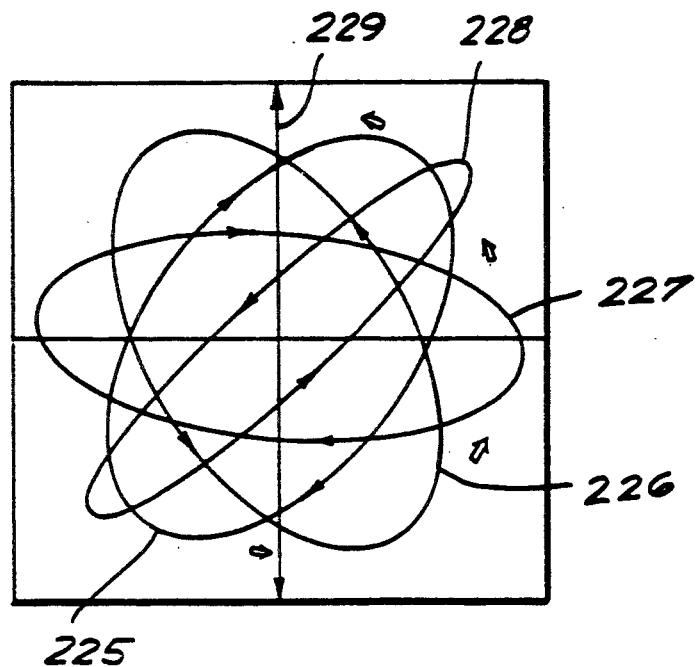

FIG. 18(a) illustrates the condition of the linearly polarized light having a wavelength of 450 nm as calculated by Equation 5 beginning with light entering the first sublayer of liquid crystal material 109 having a path denoted by reference numeral 221. The other paths 222, 223, 224 and 225 represent each fifth sublayer of liquid crystal material 109 as calculated using Equation 5 with the elliptically polarized light 225 leaving cell 103 and entering optically anisotropic layer 102 as shown in FIG. 18(b). Paths 226, 227, 228 and 229 show the change of the paths of light as calculated using Equation 5 with path 229 representing the path of light leaving optically anisotropic substance 102.

Figure 19A:
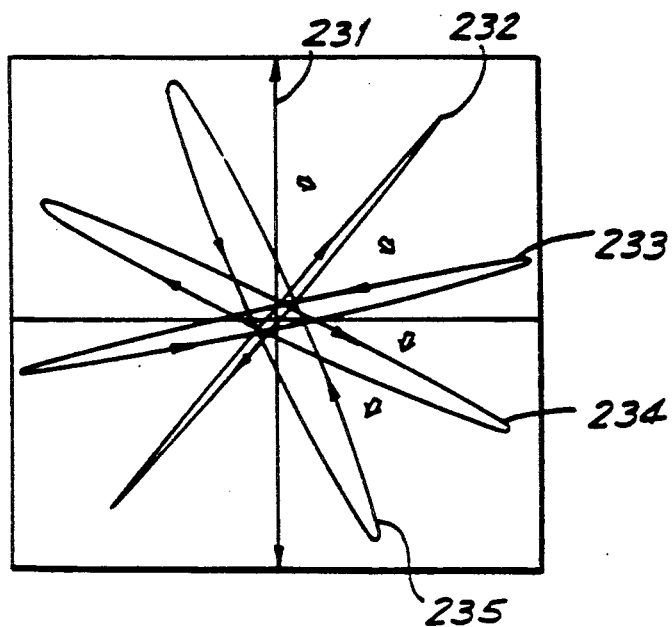
FIGS. 19(a) and (b) illustrate the optical paths travelled by polarized light having a wavelength of 550 nm passing through a twisted nematic liquid crystal cell and an optically anisotropic substance, respectively.
Figure 19B:
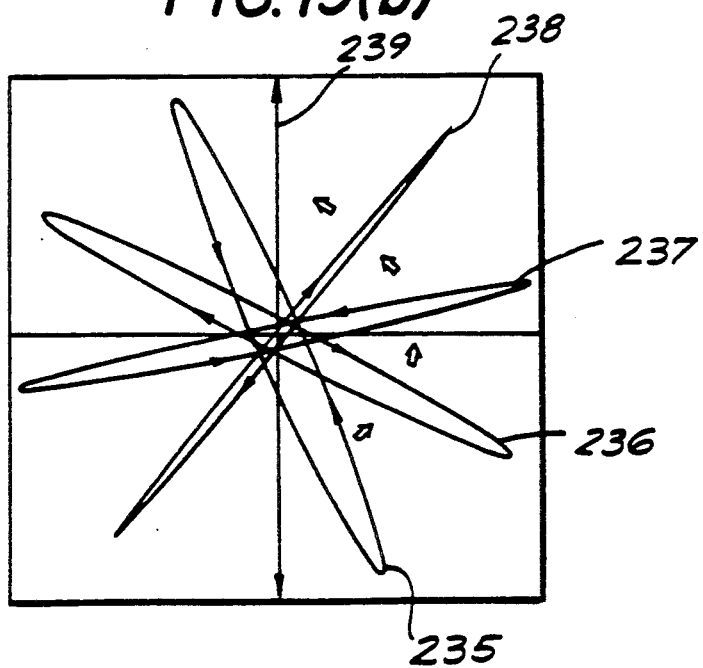
Figure 20A:
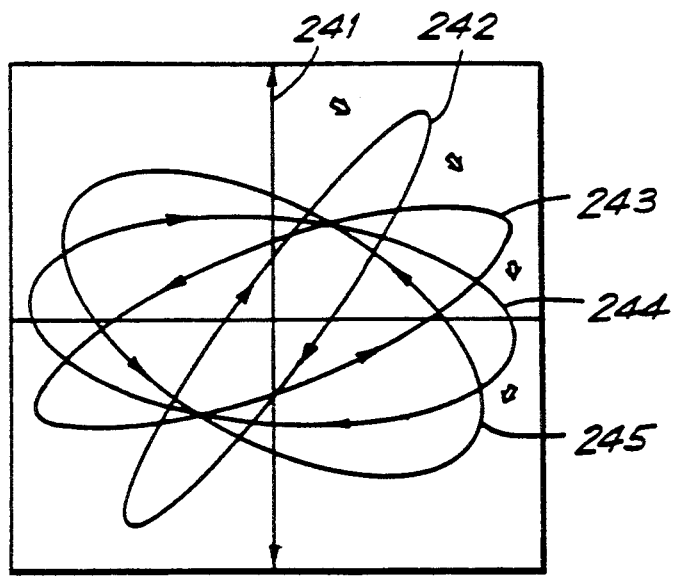
FIGS. 20(a) and (b) illustrate the optical paths travelled by polarized light having a wavelength of 650 nm passing through a twisted nematic liquid crystal cell and an optically anisotropic substance, respectively.
Figure 20B:
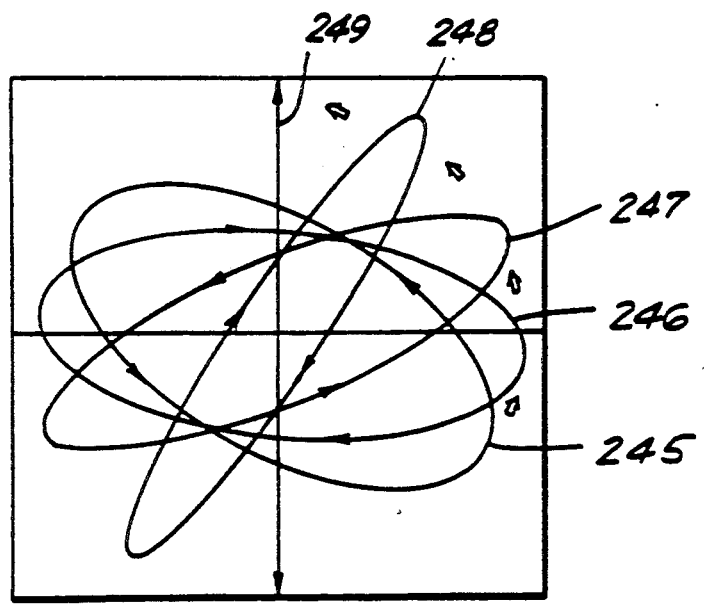

Similarly, FIG. 19(a) represents the path of light entering liquid crystal cell 103 of wavelength of 550 nm and every fifth sublayer beginning with path 231 and transitioning to paths 232, 233, 234 and finally, 235. Path 235 is the light then entering optically anisotropic layer 102 in FIG. 19(b) which then changes to paths 236, 237, 238 and finally, 239. Similarly, FIG. 20(a) shows the rotation of light of wavelength of 650 nm entering cell 103 beginning with path 241 and rotating to paths 242, 243, 244 and 245. FIG. 20(b) shows path 245 entering optically anisotropic layer 102 and rotating to paths 246, 247, 248 and finally, 249. FIGS. 18(b), 19(b) and 20(b) clearly demonstrate that an optically anisotropic material utilized in accordance with the invention cancels the elliptical effect produced by liquid crystal cell 103 such that the linearly polarized light entering cell 103 is transmitted by layer 102. Furthermore, as can be readily appreciated, this cancellation occurs regardless of the wavelength of light thereby ensuring that when device 100 is turned OFF white light will be transmitted.

Figure 21:
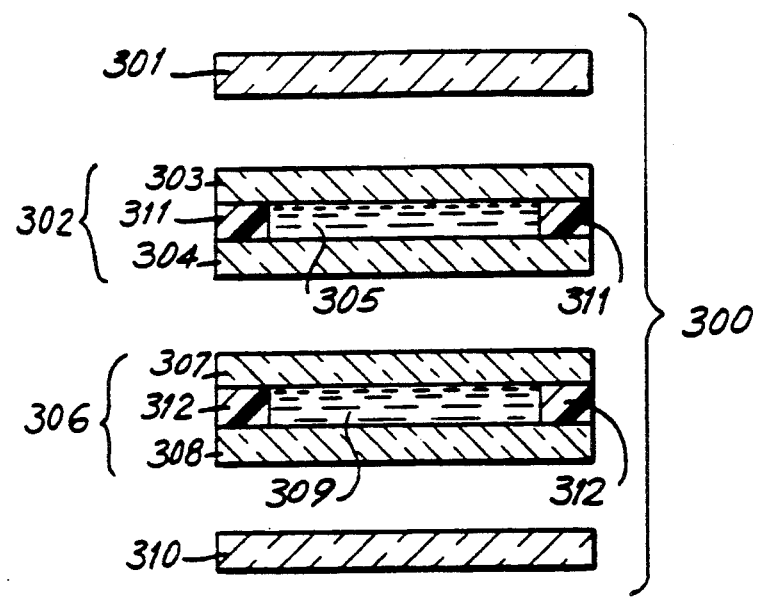
FIG. 21 is a partially exploded cross-sectional view of a liquid crystal display device similar to FIG. 7 in accordance with a further embodiment of the invention.

Referring now to FIG. 21, a liquid crystal display device 300, which can be of the positive or negative type display, includes an upper polarizer 301, an upper liquid crystal cell 302 (hereinafter referred to as the A-cell), a lower liquid crystal cell 306 (hereinafter referred to as the B-cell) and a lower polarizer 310. A-cell 302 serves as the optically anisotropic material and includes a twisted nematic liquid crystal material 305 sandwiched between an upper electrode substrate 303 and a lower electrode substrate 304. The electrode substrates of A-cell 303 and 304 do not necessarily have electrodes on their inner surfaces. Electrode substrates 303 and 304 are held apart by spacer 311. B-cell 306 also includes a twisted nematic liquid crystal 309 sandwiched between an upper electrode substrate 307 and a lower electrode substrate 308 held apart by a spacer 312. Each of the electrode substrates 303, 304, 307 and 308 are transparent.

Figure 22:
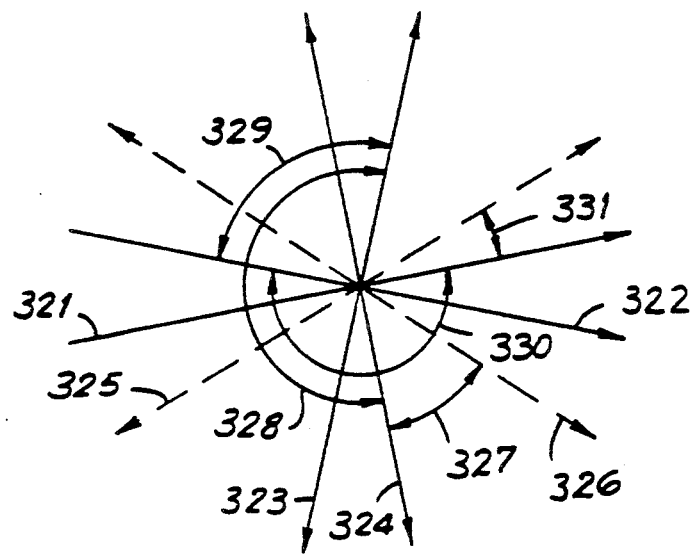
FIG. 22 diagrammatically illustrates the direction of the various axes and rubbing directions of the device of FIG. 21.

As shown in FIG. 22, the rubbing directions of upper electrode substrate 307 and lower electrode substrate 308 of B-cell 306 are denoted by reference numerals 322 and 321, respectively. The rubbing directions of the upper electrode substrate 303 and lower electrode substrate 304 of A-cell 302 are denoted by reference numerals 324 and 323, respectively, and the polarizing axes (absorption axes) of lower polarizer 310 and upper polarizer 301 are denoted by reference numerals 325 and 326, respectively. An angle 327 represents the angular difference between polarizing axis 326 (absorption axis) of upper polarizer 301 and rubbing direction 324 of upper electrode substrate 303 of A-cell 302. The twist angles of liquid crystal 305 and 309 within A-cell 302 and B-cell 306 are represented by reference numerals 328 and 330, respectively.

Twist angle 330 of liquid crystal 309 of B-cell 306 can assume any value of magnitude, that is, angle 330 is not limited to any predetermined range of values. The direction of each twist angle of each cell is from the lower electrode substrate to the upper electrode substrate thereof. The angular difference between rubbing direction 323 of lower electrode substrate 304 of A-cell 302 and rubbing direction 322 of upper electrode substrate 307 of B-cell 306 is identified by reference numeral 329. The angular difference between rubbing direction 321 of lower electrode substrate 308 of B-cell 306 and polarizing axis 325 (absorption axis) of lower polarizer 310 is denoted by reference numeral 331.

In response to a change in temperature, the Color displayed by a liquid crystal display device changes due to the change in $\Delta n \times d$ of the liquid crystal layers. By providing that the liquid crystal materials which maintain the following relationship, however, the color displayed by the liquid crystal display device will not vary:

$$0.86 \leq \frac{T_A}{T_B} \leq 1.15$$

wherein:

$T_A$ is the nematic-isotropic (NI) phase transition temperature of the liquid crystal A-cell in degrees Kelvin; and $T_B$ is the NI temperature of the liquid crystal B-cell in degrees Kelvin.

In this case, it is preferable to use the same liquid crystal material both for the A-cell and B-cell. Additionally, any changes in color displayed by a liquid crystal display device constructed in accordance with the invention due to temperature changes also may be overcome by application of voltage across the upper and lower electrode formed on the electrode substrates of each A-cell. Additionally, in order to avoid the uneven color, that is, produced by the static electricity provided by ambient conditions, it is preferable to use the liquid crystal material having a negative dielectric anisotropy $\Delta \epsilon$ for the A-cell. By providing that the liquid crystal material has a negative dielectric anisotropy $\Delta \epsilon$, no orientation disturbance due to static electricity takes place on the A-cell. Accordingly, no change in color on the display appearance results.

The liquid crystal materials which can be utilized in the liquid crystal display cell in all embodiments are twisted nematic liquid crystal materials having a positive dielectric anisotropy. These liquid crystal materials include, but are not limited to phenyl cyclohexane (PCH) and biphenyl cyclohexane (BCH) species which can be mixed with twisted nematic liquid crystals of the

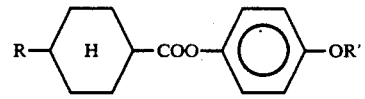

species or those which have a negative dielectric anisotropy. The same or different liquid crystal compositions can be used in A-cell 305 and B-cell 309. Preferably, however, the same nematic liquid crystal composition is used in B-cell 309 as in A-cell 305, since the mismatching of birefringence dispersion between B-cell 309 and A-cell 305 can be easily overcome. In order to obtain and maintain the necessary twist of the liquid crystal molecules, a chiral dopant is added to the composition. The dopant serves as an optical activator, and may be CB-15 (a product of BDH Corporation) which cause the spiral structure of the crystals to twist to the right or S-811 (a product of Merck Corporation). Usually, the optically anisotropic material will have a uniaxial optical anisotropy although substances having biaxial optical anisotropy can sometimes be employed.

Based on the foregoing, suitable liquid crystal compositions for liquid crystals 305 and 309 (and all other liquid crystal materials disclosed herein) include, but are not limited to, SS4008 of the CHISSO Corporation or the following compositions:

Composition 1:

-continued

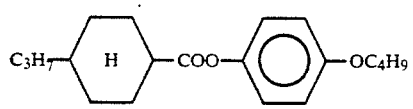 18%

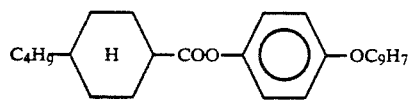 18%

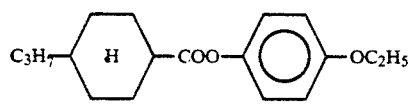 18%

 11%

 14%

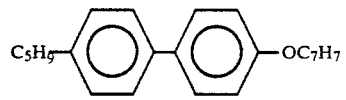 5%

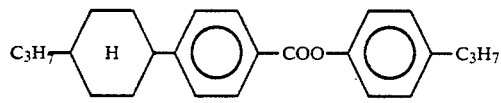 5%

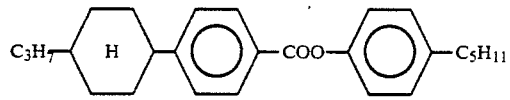 6%

 5%

Composition 2:

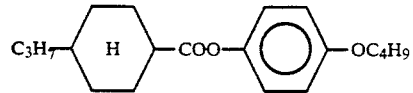 18%

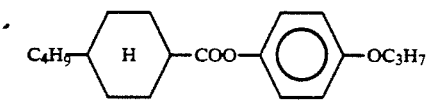 18%

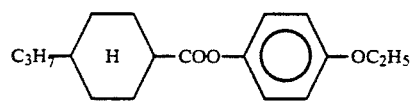 18%

-continued

14%

(C2H5 biphenyl CN)

16%

(C7H9 biphenyl CN)

6%

(C3H7–H–phenyl–COO–phenyl–C5H11)

5%

(C3H7–H–phenyl–COO–phenyl–C3H7)

5%

(C5H11–H–phenyl–phenyl–C2H5)

Although nematic liquid crystals have been described as the optically anisotropic material, other materials such as cholesteric and smectic liquid crystals can be used for the optically anisotropic material.

Device 300 is assembled by placing an adhesive layer of, for example, polyvinyl butyral film between the cells and applying heat and/or pressure to achieve adhesion to the cells. Alternately, a heat-cured epoxy, urethane or ultraviolet acrylic adhesive also can be employed. By joining A-cell 302 to B-cell 306, reflection of light on the boundary surface of both cells is minimized, if not eliminated.

In another alternative embodiment of the invention, the optically anisotropic material is a film layer such as stretched film of polyvinylalcohol, polyester, polyethylene, polyetheramide, polysulfone, diallylcarbonate (DAC), cellulose diacetate, polyamide, polyether sulfone, acryl, polyamide and the like. A further example is a polymeric liquid crystal film of a blend of a polypeptide and polymethacrylate. Other polymers than polypeptides can be combined with polypeptides. These include polymeric liquid crystals that show cholesteric phase, such as:

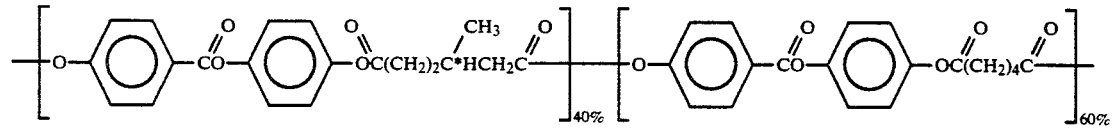

Examples of liquid crystals in the polymer matrix include compositions of PCH, CCH, biphenyl compounds and chiral components. The polymer matrix may be polymethyl-methacrylate, polyvinylacetal, polyamide, and the like. An example of a liquid crystal composition suitable for use in the polymer matrix is as follows:

17%

(C5H11–phenyl–COO–phenyl–OC2H5)

-continued

C₅H₁₁—⟨O⟩—COO—⟨O⟩—OC₃H₇  17%

C₂H₅—⟨O⟩—⟨O⟩—CN  16%

C₉H₉—⟨O⟩—⟨O⟩—CN  16%

C₃H₇—⟨O⟩—⟨O⟩—CO—⟨O⟩—⟨H⟩—C₅H₁₁  30%

C₅H₁₁—⟨O⟩—⟨O⟩—CN  4%

In Examples 1-2 which follow, the angles and directions given refer to device 300 as shown and described in FIGS. 21 and 22. Each of these Examples results in white light being transmitted by device 300 in the OFF state and appears black in the ON state. The OFF and ON states indicate that device 300 is transmitting most of the light passing therethrough or allowing none to pass.

For illustrative purposes only, natural light is introduced through upper polarizer 301. Depending upon the direction of the axes described below, either white light is transmitted through lower polarizer 310 or the cell appears black.

EXAMPLE 1

Figure 23:
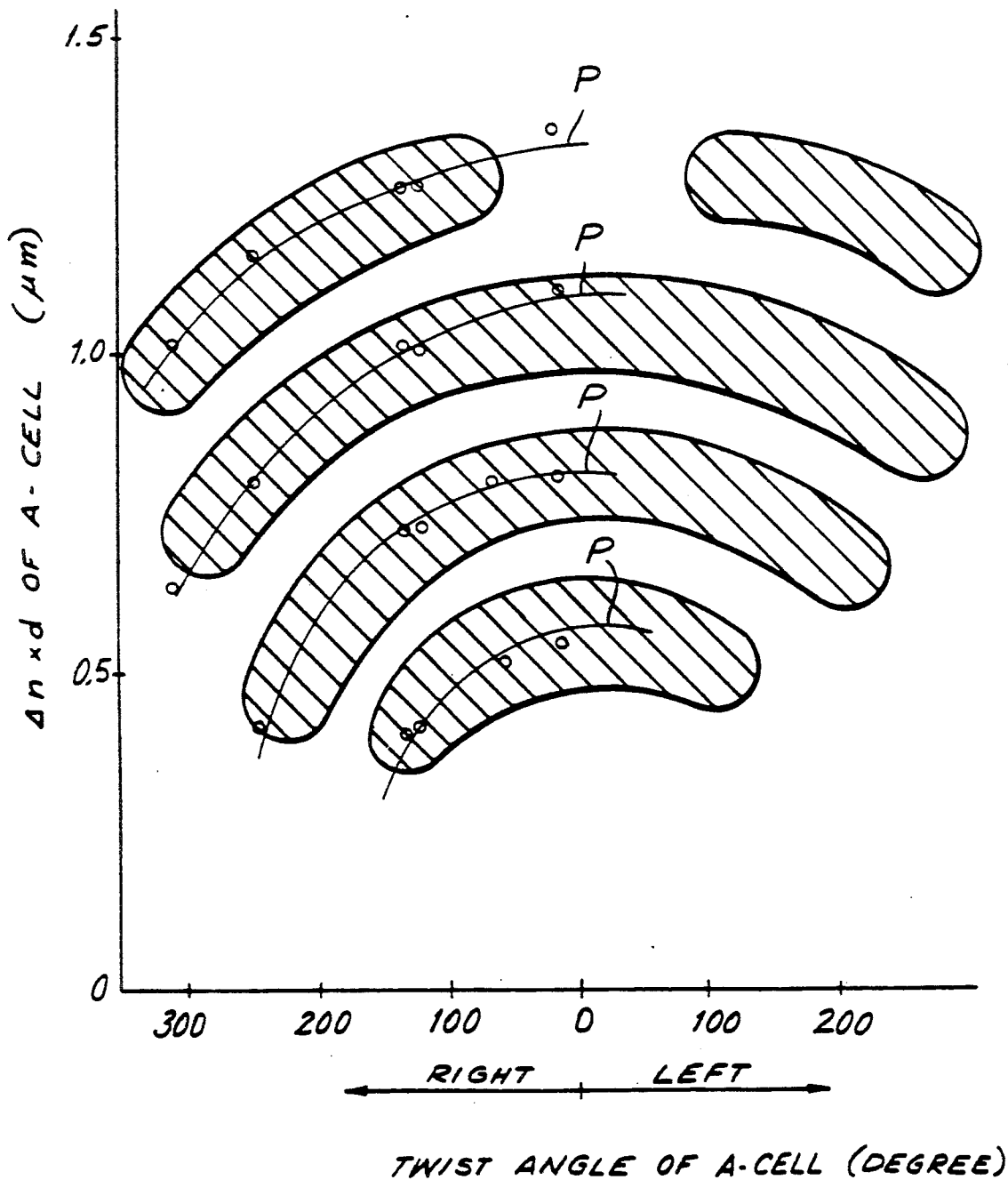
FIG. 23 is a first plot of birefringence ($\Delta n$) times thickness (d) versus twist angle of an optically anisotropic material in the device of FIG. 21.

Angle 327 is between about 30° and 60°, angle 329 is about 90°, twist angle 330 is about 200° to the left, and $\Delta n \times d$ of liquid crystal 309 is about 0.9 μm. Twist angle 328 and $\Delta n \times d$ of liquid crystal 305 of A-cell 302 fall within the regions marked by the oblique lines shown in FIG. 23. Device 300 is white in the OFF state and black in the ON state.

EXAMPLE 2

Figure 24:
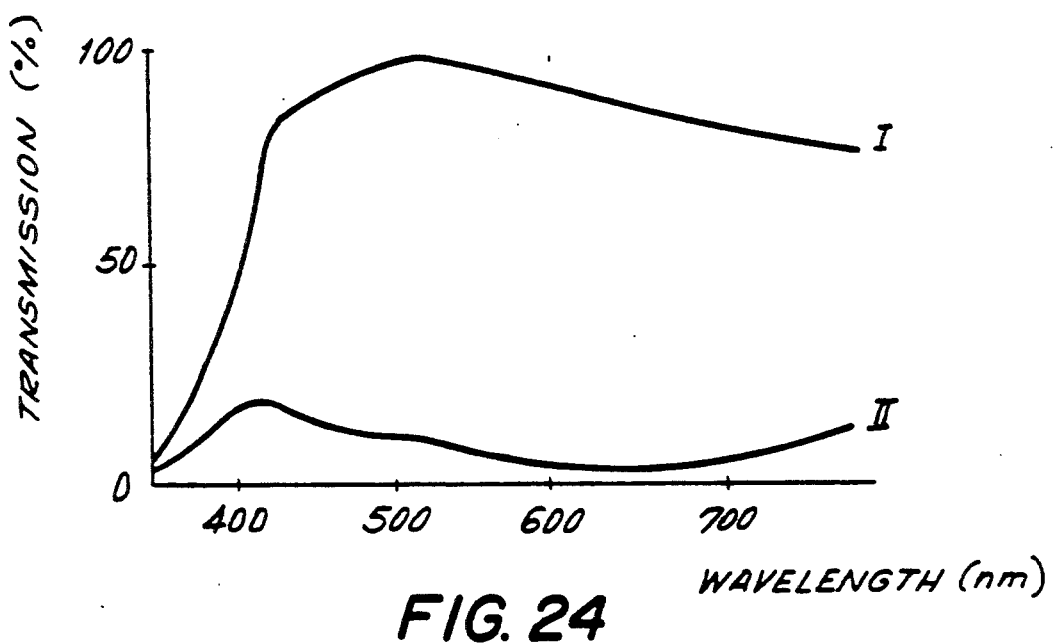
FIG. 24 is a first plot of the light transmittance spectrum which can be produced by the device of FIG. 21.

Angle 327 is about 40°, twist angle 328 is about 140° to the right, twist angle 329 is about 90°, twist angle 330 is about 200° to the left, angle 331 is about 40°, $\Delta n \times d$ of liquid crystal 305 of A-cell 302 is about 0.7 μm, and $\Delta n \times d$ of liquid crystal 309 of B-cell 306 is about 0.9 μm. The optical spectrum displayed by device 300 is shown in FIG. 24 where curve I represents the OFF state and curve II represents the ON state. As pointed out above, the external spectrum produced by device 300 in the OFF state is a white color and in the ON state is a black color (i.e., no light transmitted). In contrast thereto, and as previously noted, prior art liquid crystal display devices which include only the B-cell having, for example, the above parameters will produce a yellow color in the OFF state and a blue color in the ON state.

EXAMPLE 3

Figure 25:
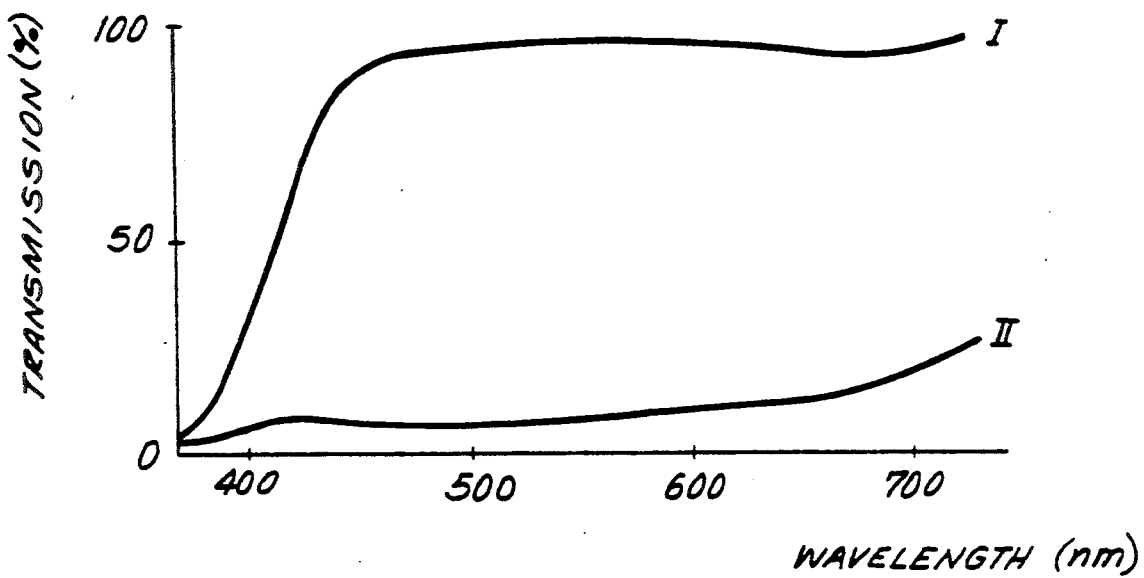
FIG. 25 is a second plot of the light transmittance spectrum which can be produced by the device of FIG. 21.

Angle 327 is about 40°, twist angle 328 is about 200° to the right, angle 329 is about 90°, twist angle 330 is about 200° to the left, angle 331 is about 50°, $\Delta n \times d$ of liquid crystal 305 A-cell 302 is about 0.9 μm, and $\Delta n \times d$ of liquid crystal 309 of B-cell 306 is about 0.9 μm. The optical spectrum displayed by device 300 is shown in FIG. 25 wherein curve I shows the OFF state and curve II shows the ON state. As in Example 2, the device 300 is a white color in the OFF state and appears black in the ON state.

EXAMPLE 4

Figure 26:
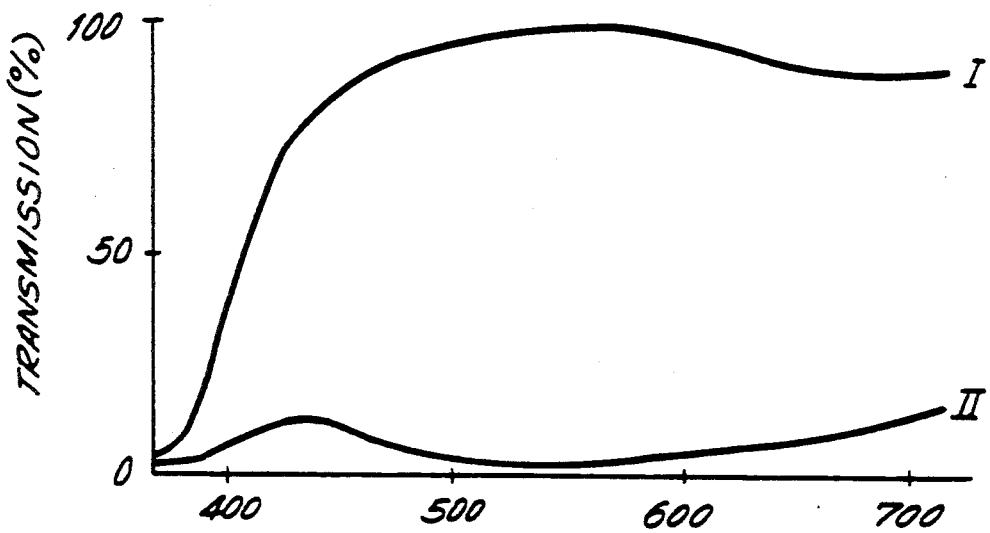
FIG. 26 is a third plot of the light transmittance spectrum which can be produced by the device of FIG. 21.

Angle 327 is about 40°, twist angle 328 is about 260° to the right, angle 329 is about 90°, twist angle 330 is about 200° to the left, angle 331 is about 40°, $\Delta n \times d$ of liquid crystal 305 of A-cell 302 is about 0.8 μm, and $\Delta n \times d$ of liquid crystal layer 309 of B-cell 306 is about 0.9 μm. The optical spectrum displayed by device 300 is shown in FIG. 26 wherein curve I shows the OFF state and curve II shows the ON state. As in Examples 2 and 3, device 300 is white in the OFF state and becomes black in the ON state.

EXAMPLE 5

Figure 27:
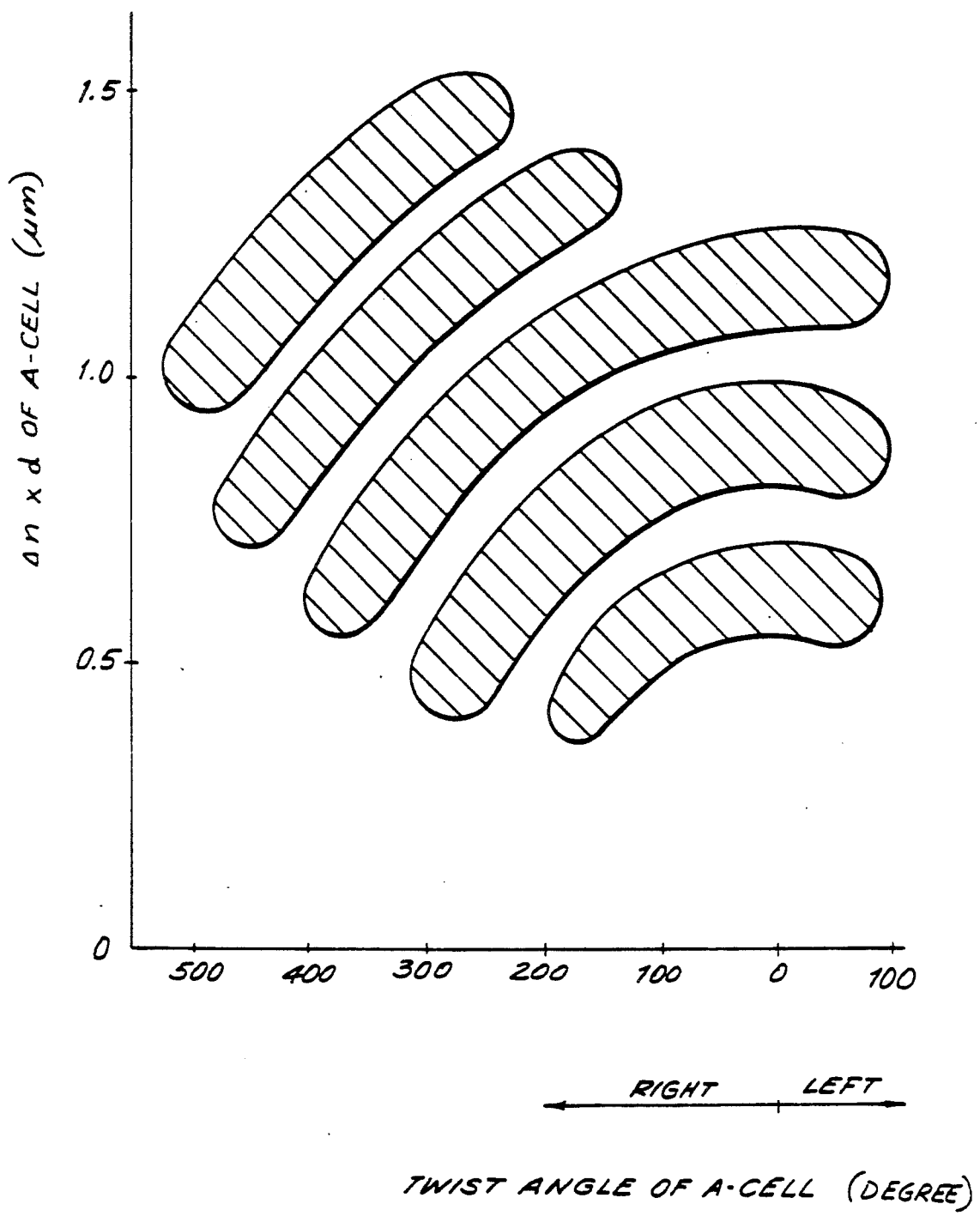
FIG. 27 is a second plot of birefringence ($\Delta n$) times thickness (d) versus twist angle of the optically anisotropic material in the device of FIG. 21.

Angle 327 is between about 30° and 60°, $\Delta n \times d$ is about 0.9 μm, angle 329 is about 90°, angle 330 is about 250° to the left, and angle 331 is between about 30° and 60°. Twist angle 328 and $\Delta n \times d$ of liquid crystal 305 of A-cell 302 fall within the regions marked by the oblique lines shown in FIG. 27. As in Examples 2 and 3, device 300 is white in the OFF state and becomes black in the ON state.

EXAMPLE 6

Figure 28:
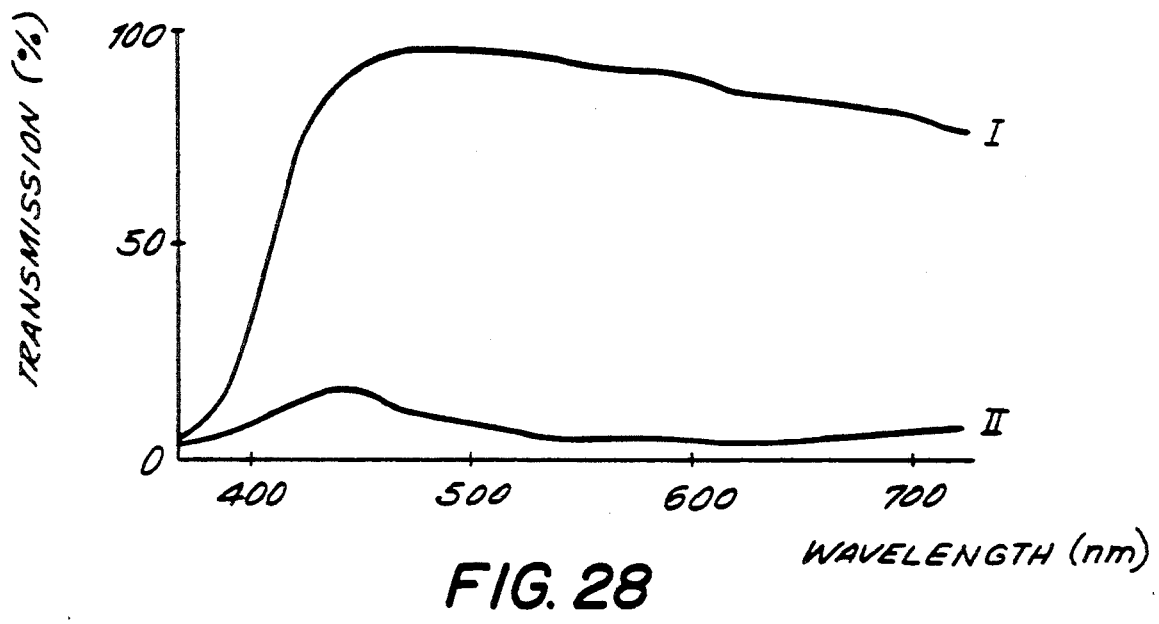
FIG. 28 is a fourth plot of the light transmittance spectrum which can be produced by the device of FIG. 21.

Angle 327 is about 40°, twist angle 328 is about 160° to the right, angle 329 is about 90°, twist angle 330 is about 250° to the left, angle 331 is about 40°, $\Delta n \times d$ of liquid crystal 305 of A-cell 302 is about 0.8 μm, and $\Delta n \times d$ of liquid crystal 309 of B-cell 306 is about 0.9 μm. The optical spectrum displayed by device 300 is shown in FIG. 28 wherein curve I shows the "OFF" state and curve II shows the "ON" state. As in Examples 2 and 3, device 300 is white in the OFF state and becomes black in the ON state.

EXAMPLE 7

Angle 327 is about 40°, twist angle 328 is about 360° to the right, angle 329 is about 90°, twist angle 330 is about 250° to the left and angle 331 is about 40°. Additionally, $\Delta n \times d$ of liquid crystal 305 is about 1.0 μm and $\Delta n \times d$ of liquid crystal 309 of B-cell 306 is about 0.9 μm. As in Examples 2 and 3, device is white in the OFF state and becomes black in the ON state.

EXAMPLE 8

Angle 327 is about 50°, twist angle 328 of liquid crystal 305 of A-cell 302 is about 170° to the right, angle 329 is about 90°, twist angle 330 of liquid crystal 309 of B-cell 306 is about 170° to the left and angle 331 is about 40°. Additionally, $\Delta n \times d$ of liquid crystals 305 and 309 are both about 0.7 μm. Device 300 has a high response speed. As in Examples 2 and 3, device 300 is white in the OFF state and becomes black in the ON state.

EXAMPLE 9

Figure 29:
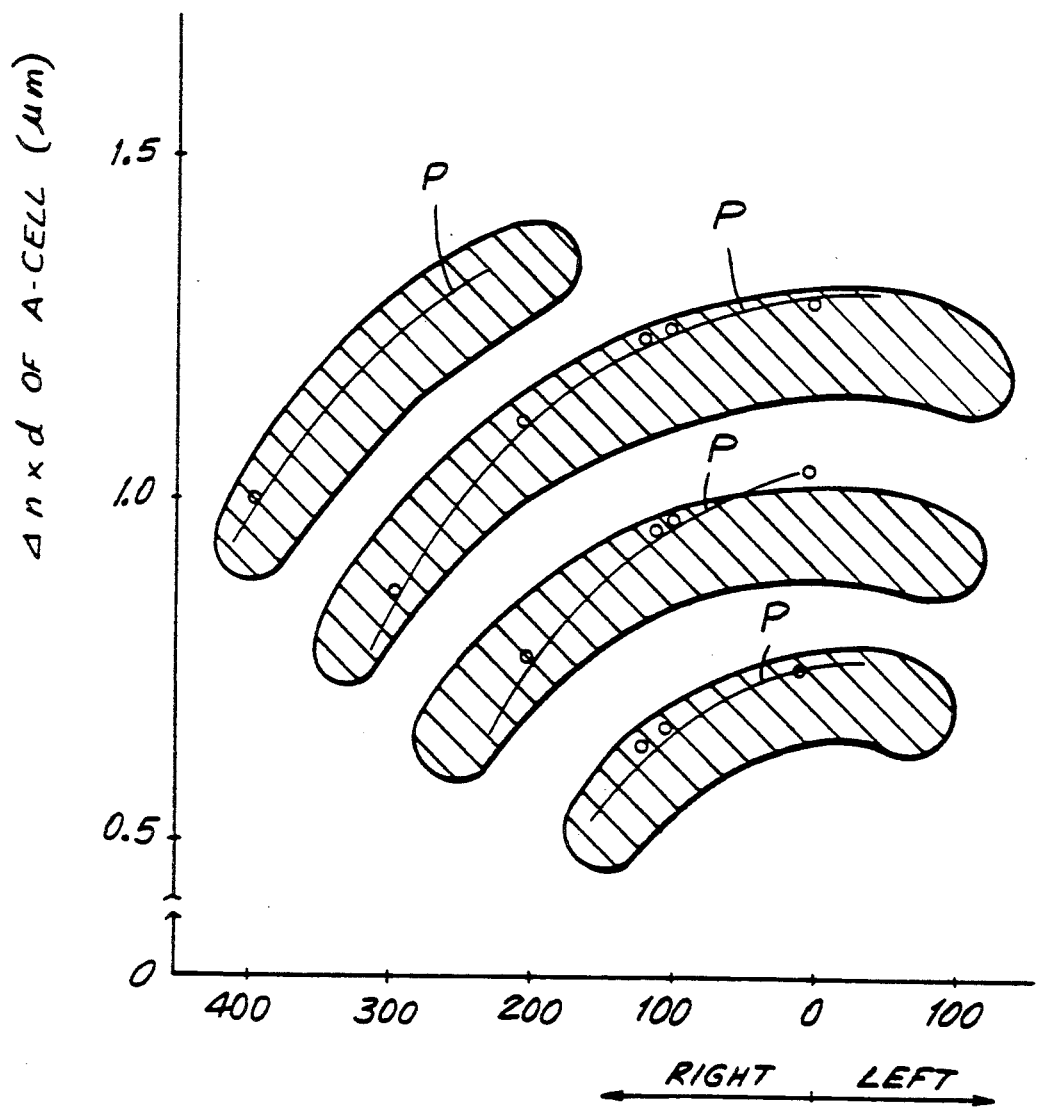
FIG. 29 is a third plot of birefringence ($\Delta n$) times thickness (d) versus twist angle of the optically anisotropic material in the device of FIG. 21.

Twist angle 330 of crystal 309 of B-cell 306 is about 120° to the left, $\Delta n \times d$ of liquid crystal 309 of B-cell 306 is about 0.9 μm, angle 329 is about 90°, and angle 327 and angle 331 are both between about 30° and 60°. Twist angle 328 and $\Delta n \times d$ of liquid crystal 305 of A-cell 302 fall within the regions marked by oblique lines shown in FIG. 29. As in Examples 2 and 3, device 300 is white in the OFF state and becomes black in the ON state.

EXAMPLE 10

Figure 30:
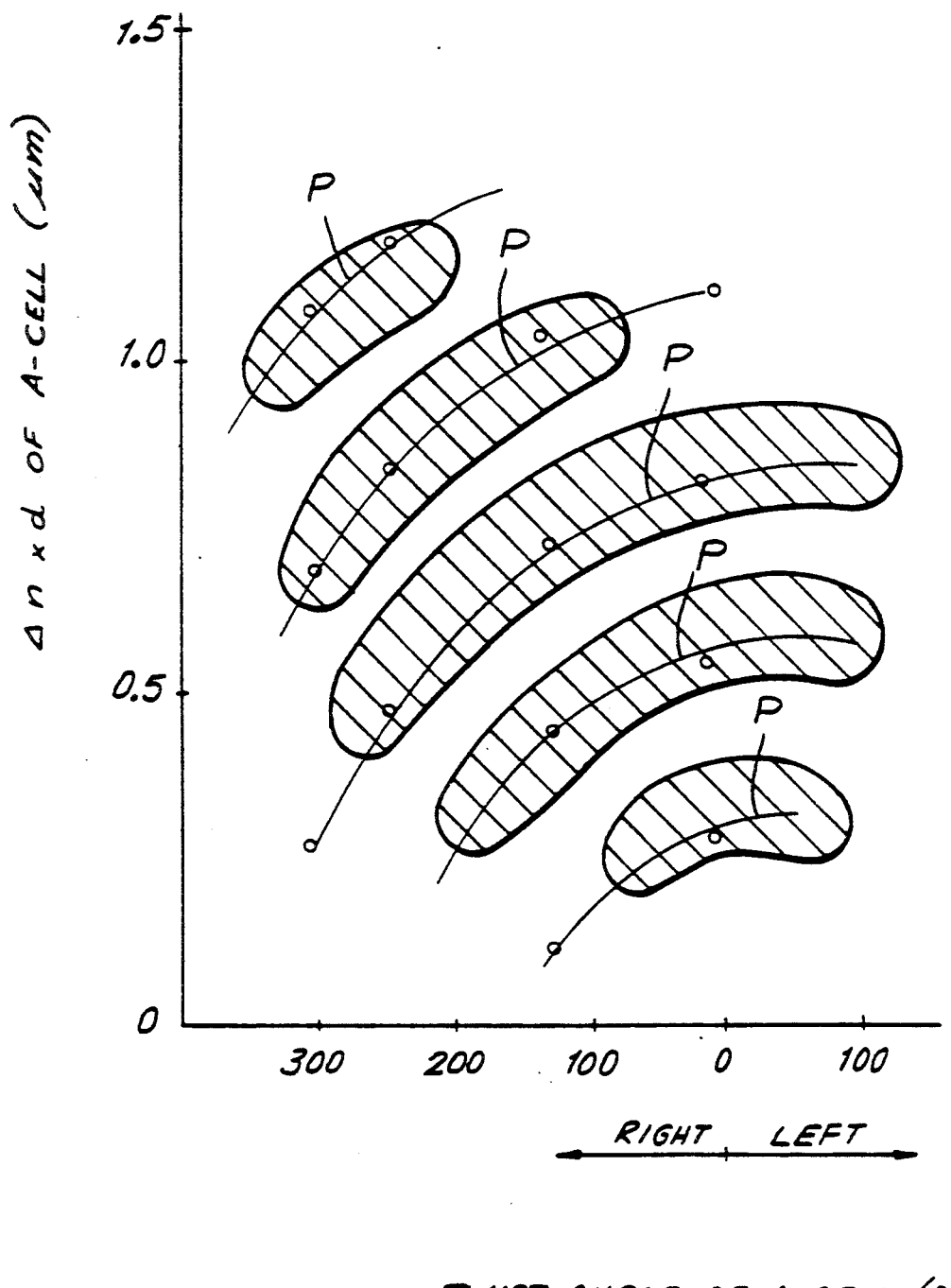
FIG. 30 is a fourth plot of birefringence ($\Delta n$) times thickness (d) versus twist angle of the optically anisotropic material in the device of FIG. 21.

Twist angle 330 of liquid crystal 109 of B-cell 306 is about 200° to the left, $\Delta n \times d$ of liquid crystal 309 of B-cell 306 is about 0.6 μm, angle 329 is about 90°, and angle 327 and angle 331 are both between about 30° and 60°. Twist angle 328 and $\Delta n \times d$ of liquid crystal 305 of A-cell 302 fall within the regions marked by oblique lines as shown in FIG. 30. As in Examples 2 and 3, device 300 is white in the OFF state and becomes black in the ON state.

EXAMPLE 11

Figure 31:
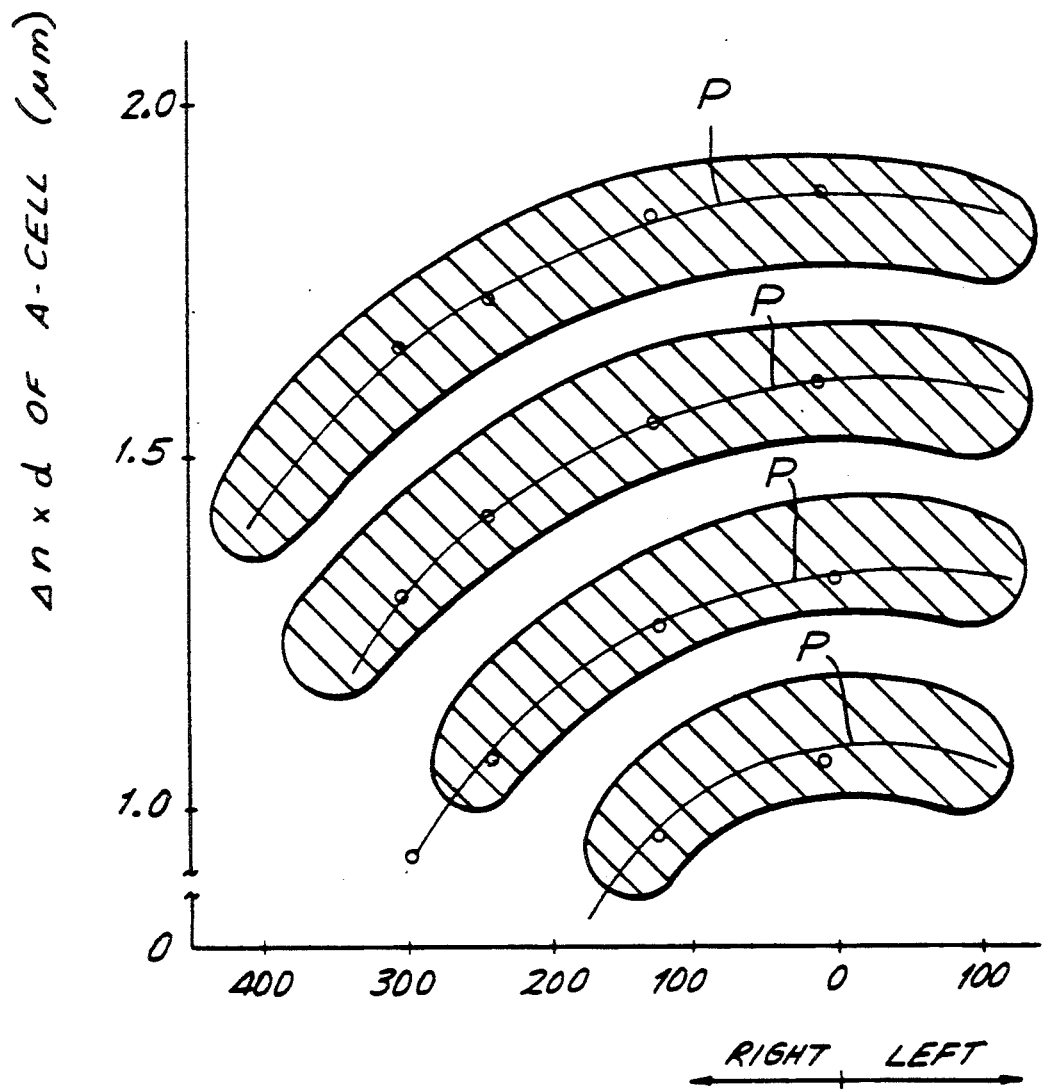
FIG. 31 is a fifth plot of birefringence ($\Delta n$) times thickness (d) versus twist angle of the optically anisotropic material in the device of FIG. 21.

Twist angle 330 of liquid crystal 309 of B-cell 306 is once again about 200° to the left, $\Delta n \times d$ of liquid crystal 309 of B-cell 306 is now about 1.5 μm, angle 329 is about 90° and both angles 327 and 331 are between about 30° and 60°. Twist angle 328 and $\Delta n \times d$ of liquid crystal 305 of A-cell 302 fall within the regions marked by oblique lines shown in FIG. 31. As in Examples 2 and 3, device 300 is white in the OFF state and becomes black in the ON state.

EXAMPLE 12

Figure 32:
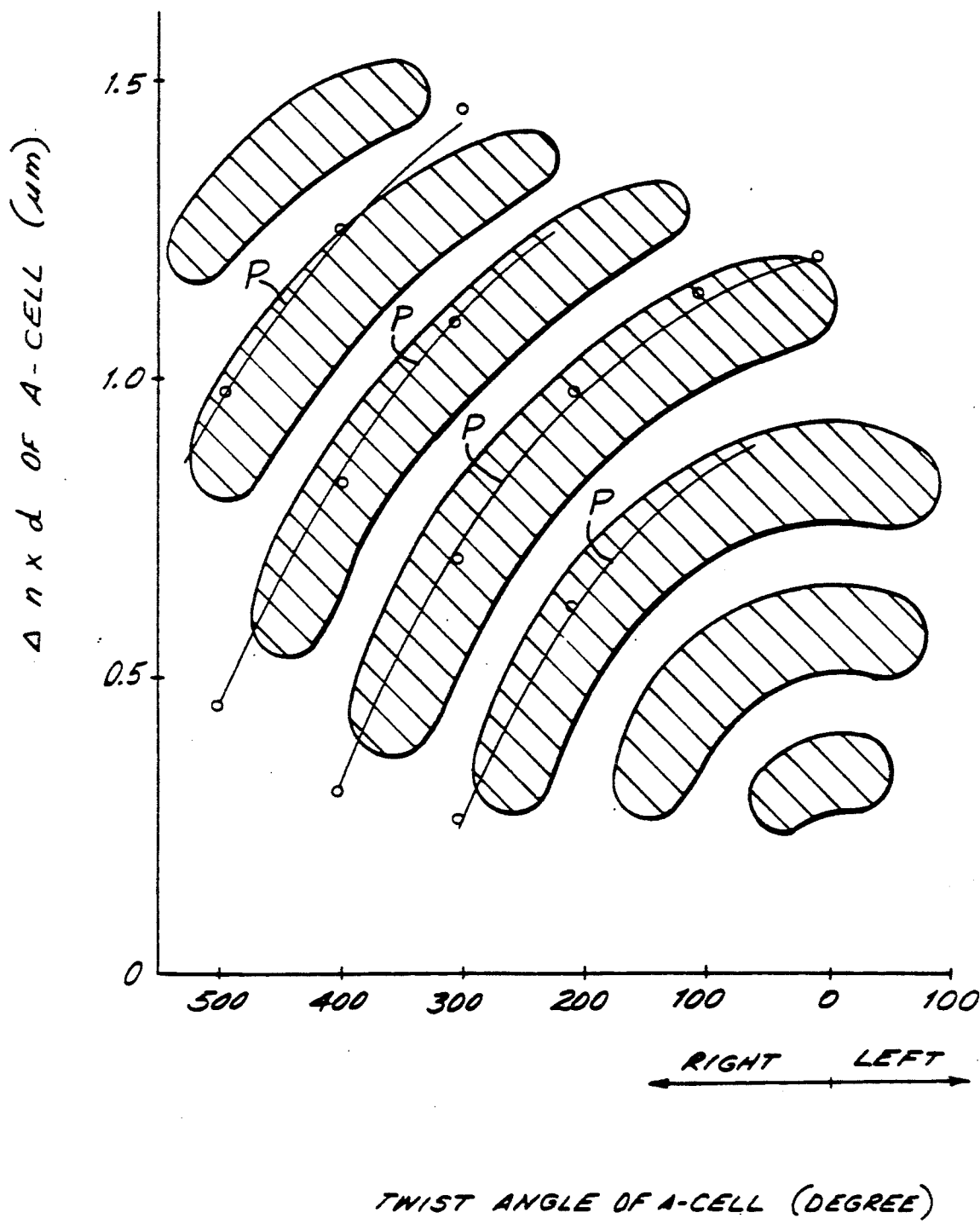
FIG. 32 is a sixth plot of birefringence ($\Delta n$) times thickness (d) versus twist angle of the optically anisotropic material in the device of FIG. 21.

Twist angle 330 of liquid crystal 309 of B-cell 306 is about 350° to the left, $\Delta n \times d$ of B-cell 306 is about 0.9 μm, angle 329 is about 90° and angles 327 and 331 are both between 30° and 60°. Twist angle 328 and $\Delta n \times d$ of liquid crystal 305 of A-cell 302 fall within the regions marked by the oblique lines shown in FIG. 32. As in Examples 2 and 3, device 300 is white in the OFF state and becomes black in the ON state.

Alternatively, electrode substrate 304 of A-cell 302 and electrode substrate 307 of B-cell 306 can be replaced with a single substrate having electrodes on both opposed surfaces. The single substrate would have two rubbing directions, namely, on the top and bottom surfaces thereof whose angular difference would be represented by angle 329. As can be readily appreciated, the values of the different angles and $\Delta n \times d$ set forth in Examples 1–12 when reproduced using a single electrode substrate rather than electrode substrates 304 and 307 will also result in a liquid crystal display device producing white lights in the OFF state and appear black in the ON state.

Conditions for obtaining a substantially pure monochromatic display (i.e. pure white and black) when a liquid crystal cell is used as the A-cell to compensate for elliptical polarization of light passing through another liquid crystal cell serving as the B-cell are shown in FIGS. 23, 27, 29, 30, 31 and 32. The optimal relationship between the twist angle and $\Delta n \times d$ of the A-cell for obtaining a substantially pure monochromatic display based on six (6) specified conditions for twist angle and $\Delta n \times d$ of the B-cell is indicated by the cross-hatched regions of FIGS. 23, 27, 29, 30, 31 and 32 and can be represented by one of two sets of equations.

When the twist angle and $\Delta n \times d$ of the B-cell fall within region "a" of FIG. 37 the optimal relationship is determined as follows:

$$\Delta n \times d(A) = a_1 \times TA(A)^2 + a_2, \quad \text{(Eqs. I)}$$
where
$$a_2 = a_3 \times \Delta n \times d(B) + a_4 + 0.275 \times n$$
$$a_1 = a_5 \times \exp(a_6 \times a_2) \times (1 - a_7)$$
$$a_3 = a_8 \times \exp(a_9 \times TA(B))$$
$$a_4 = a_{10} \times \exp(a_{11} \times TA(B))$$
$$a_7 = a_{12} \times \exp(a_{13} \times \Delta n \times d(B))$$

where:

$\Delta n \times d(A)$ is $\Delta n \times d$ (in μm) of the A-cell TA(A) is the value (in degrees) of the twist angle of the A-cell $\Delta n \times d(B)$ is $\Delta n \times d$ (in μm) of the B-cell TA(B) is the value (in degrees) of the twist angle of the B-cell and is positive n is an integer, 0, ±1, ±2, ...

$a_5 = -2.10 \times 10^{-5}$
$a_6 = -1.07$
$a_8 = 1.08$
$a_9 = -1.12 \times 10^{-3}$
$a_{10} = 8.55 \times 10^{-2}$
$a_{11} = 6.47 \times 10^{-3}$
$a_{12} = 0.50$
$a_{13} = -0.90$ The suitable range of the twist angle TA(A) is the calculated value ±4° and the suitable range of the product $\Delta n \times d(A)$ is the product ±0.1 μm.

When the twist angle and $\Delta n \times d$ of the B-cell fall within region "b" of FIG. 37 the optimal relationship is determined as follows:

$$\Delta n \times d(A) = a_1 \times TA(A)^2 + a_2 \quad \text{(Eqs. II)}$$
$$a_2 = a_3 \times \Delta n \times d(B) + a_4 + 0.275 \times n$$
$$a_1 = a_5 \times \exp(a_6 \times a_2) \times (1 - a_7) \times a_{14}$$
$$a_3 = a_8 \times \exp(a_9 \times TA(B))$$
$$a_4 = a_{10} \times \exp(a_{11} \times TA(B))$$
$$a_7 = a_{12} \times \exp(a_{13} \times \Delta n \times d(B))$$
$$a_{14} = a_{15} \times \exp(a_{16} \times TA(B))$$

$a_5 = -2.10 \times 10^{-5}$
$a_6 = -1.07$
$a_8 = 1.08$
$a_9 = -1.12 \times 10^{-3}$
$a_{10} = 8.55 \times 10^{-2}$
$a_{11} = 6.47 \times 10^{-3}$
$a_{12} = 0.50$
$a_{13} = -0.90$
$a_{15} = 2.50 \times 10^{-2}$
$a_{16} = 1.13 \times 10^{-2}$ The suitable range of twist angle TA(A) is the calculated value ±40° and the suitable range of the product $\Delta n \times d(A)$ is the calculated value ±0.1 μm.

The dimensional units for parameters $a_1$–$a_{16}$ in Eqs. 1 and Eqs. 2 are as follows:

| Parameters | Dimensional Unit |
| --- | --- |
| a1 | μm deg$^{-2}$ |
| a2 | μm |
| a3 | unitless |
| a4 | μm |
| a5 | μm deg$^{-2}$ |
| a6 | μm$^{-1}$ |
| a7 | unitless |
| a8 | unitless |
| a9 | deg$^{-1}$ |
| a10 | μm |
| a11 | deg$^{-1}$ |
| a12 | unitless |
| a13 | μm$^{-1}$ |
| a14 | unitless |
| a15 | unitless |
| a16 | deg$^{-1}$ |

Lines "P" shown in FIGS. 23, 29, 30, 31 and 32 represent the optimal relationship between twist angle and $\Delta n \times d$ as determined by Eqs. I and II. In accordance with the invention, the suitable range of values of twist angle and $\Delta n \times d$ represented by at least the shaded (cross-hatched) regions in FIGS. 23, 27, 29, 30, 31 and 32 twist angle. In these regions the twist angle TA(A) can vary by ±40° and $\Delta n \times d(A)$ can vary ±0.1 μm, respectively, from the values calculated from Eqs. I and II. In a more preferred embodiment of the invention the range of twist angle TA(A) is ±20° and the range of the produce $\Delta n \times d(A)$ is ±0.05 µm. In other words, whether in region a or region b of FIG. 37, the value of $\Delta n \times d(A)$ represented by at least the shaded areas of FIGS. 23, 27, 29, 30, 31 and 32 are included within the range of TA(A) ±40° and of $\Delta n \times d(A)$ ±0.1 µm where TA(A) and $\Delta n \times d(A)$ are determined Eqs. I or II as set forth. The values of $a_1$ and $a_2$ are determined based on whether the values of $\Delta n \times d$ and twist angle of the B-cell fall within region a or b of FIG. 37.

Figure 33:
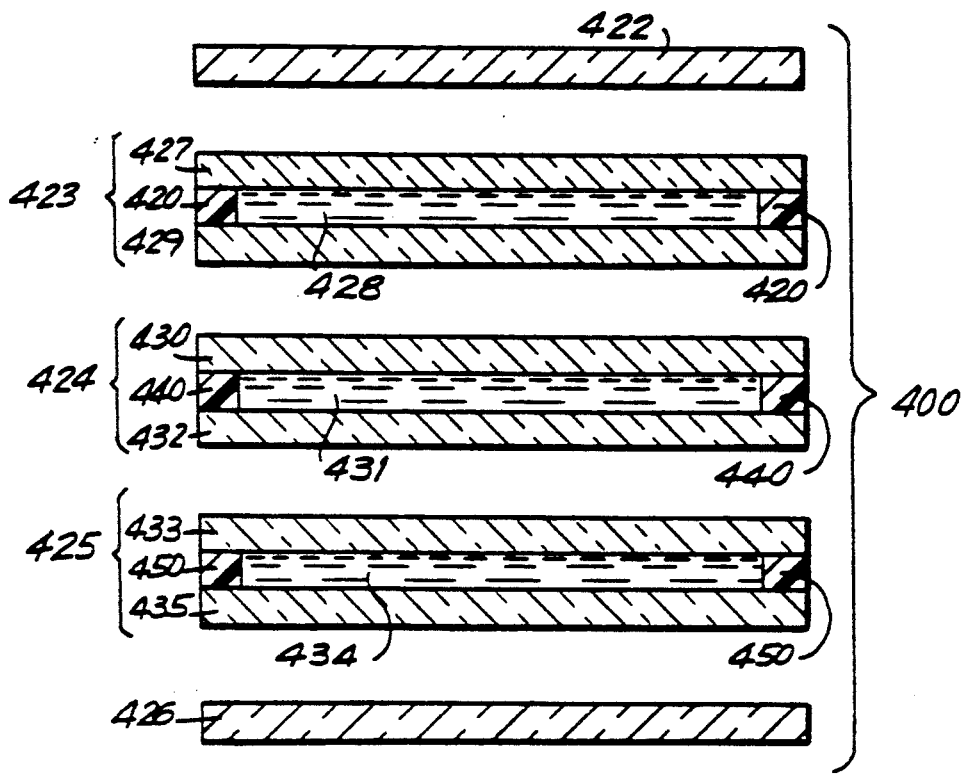
FIG. 33 is a partially exploded cross-sectional view of a liquid crystal display device similar to FIG. 16 in accordance with another alternative embodiment of the invention.

Similar to FIG. 16 above, the optically anisotropic material can be broken into two twisted nematic liquid crystals rather than just one twisted nematic liquid crystal as disclosed heretofore. More particularly, as shown in FIG. 33, two optically anisotropic layers represented as upper A-cell 423 and lower A-cell 425 together form the complete optically anisotropic substance of liquid crystal device 400. Liquid crystal device 400 also comprises an upper polarizer 422, a liquid crystal cell (B-cell) 424, and a lower polarizer 426. Upper A-cell 423 includes a twisted nematic liquid crystal material 428 sandwiched between an upper electrode substrate 427 and a lower electrode substrate 429. A spacer 420 holds electrode substrates 427 and 429 apart. B-cell 424 includes a twisted nematic liquid crystal material 431 sandwiched between an upper electrode substrate 430 and lower electrode substrate 432 which are spaced apart by a spacer 440.

Lower A-cell 425 includes a twisted nematic liquid crystal material 434 sandwiched between an upper electrode substrate 433 and a lower electrode substrate 435 spaced apart by a spacer 450. The electrode substrates of A-cells 427, 429, 433 and 435 do not necessarily have electrodes on their inner surfaces. Liquid crystal compositions 428 and 434 of upper A-cell 423 and lower A-cell 425, respectively, are both twisted to the right as viewed going from the lower electrode substrate to the upper electrode substrate of each cell. Therefore, the twists in the liquid crystal in upper A-cell and lower A-cell when added together represent the total twist angle provided by the A-cells. Similarly, $\Delta n \times d$ of each of the liquid crystal compositions 428 and 434 when added together represent the total $\Delta n \times d$ of the A-cells of device 400. By providing that the twist angles and $\Delta n \times d$ of A-cells 423 and 425 equal the twist angle and $\Delta n \times d$ of A-cell 302 and that all other angles as set forth in Examples 1-12 are the same, device 400 will provide the same white light in its OFF state and appear black in the ON state as does device 300.

It is also possible to modify device 400 to reduce the number of elements. For example, lower electrode substrate 429 of upper A-cell 420 and upper electrode substrate 430 of B-cell 424 can be a unitary electrode substrate. In this case the same rubbing directions 429 and 430 are maintained on the top and bottom surfaces of the single electrode substrate substitute.

Figure 34:
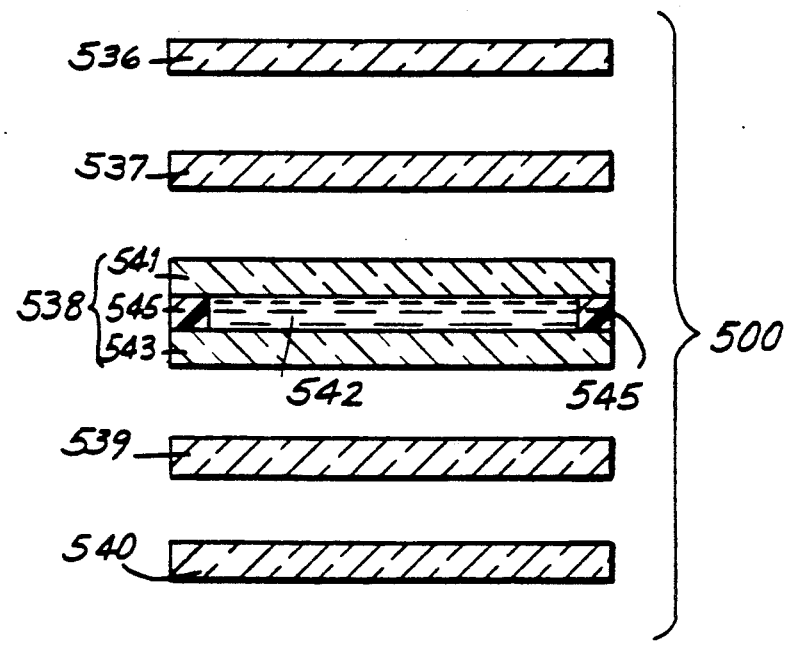
FIG. 34 is a partially exploded cross-sectional view of a liquid crystal display device also similar to FIG. 16 in accordance with yet another alternative embodiment of the present invention.

Device 500, as shown in FIG. 34, is another alternative embodiment of the invention. Device 500 includes an upper polarizer 536, an upper A-film 537, a B-cell 538, a lower A-film 539 and a lower polarizer 540. B-cell 538 includes an upper electrode substrate 541 spaced apart from a lower electrode substrate 543 by a spacer 545. A liquid crystal 542 is in the space between electrode substrates 538 and 543.

Figure 35:
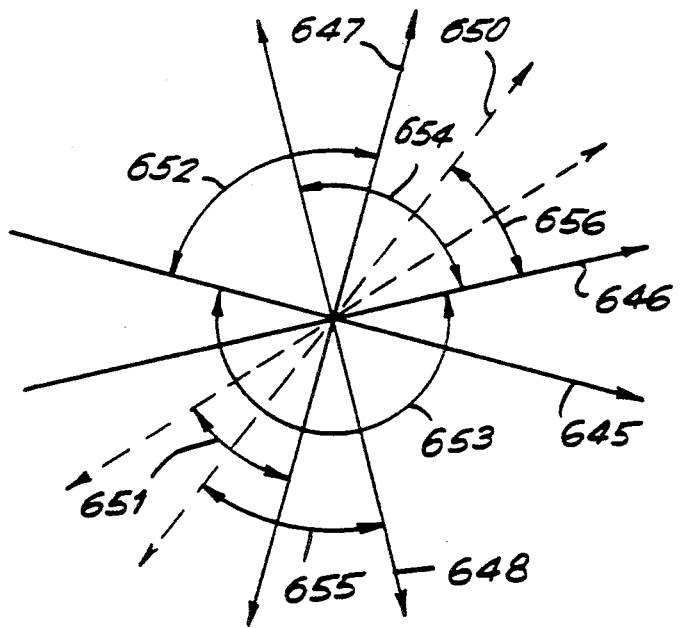
FIG. 35 diagrammatically illustrates the direction of the various axes and rubbing directions of the device of FIG. 34.

Referring now to FIG. 35, the rubbing directions of upper electrode substrate 541 and lower electrode substrate 543 of B-cell 538 are denoted by numerals 645 and 646, respectively. The optical axes of upper A-film 537 and lower A-film 539 are denoted by reference numerals 647 and 648, respectively. The polarizing axes of upper polarizer 536 and lower polarizer 540 are identified by reference numerals 649 and 650, respectively. Additionally, the angular difference between optical axis 647 and rubbing direction 645 is denoted by reference numeral 652. The angular difference between rubbing direction 646 and rubbing direction 645, that is, the twist in the liquid crystal material 545 of B-cell 538 is denoted by reference numeral 653. Furthermore, the angular difference between rubbing direction 646 and optical axis 648 is denoted by reference numeral 654. The angle formed by the optical axis 648 of lower A-film 539 and polarizing axis 650 of lower polarizer 540 is represented by reference numeral 655. Finally, the angle formed by rubbing direction 646 of electrode substrate 543 and polarizing axis 650 of polarizer 540 is denoted in reference numeral 656.

In Examples 13-21 which follow, the angles and directions given refer to device 500 without lower A-film 539 (unless otherwise noted), as shown and described in FIGS. 34 and 35. In all instances, the angles, directions and other values given will enable device 500 to transmit a white colored light in the OFF state and appear black (i.e., no light transmitted) in the ON state. This is the same as described in connection with previous alternative embodiments of the invention. The twist angle of B-cell 538 is from lower electrode substrate 543 to upper electrode substrate 541.

EXAMPLE 13

Angle 651 is about 40°, angle 652 is about 90°, twist angle 653 is about 200° to the left and angle 656 is about 40°. The product of refractive index anisotropy $\Delta n$ and the thickness of upper A-film 537 (d), that is, $\Delta n \times d$, is about 0.55 µm and $\Delta n \times d$ of liquid crystal 542 of B-cell 538 is about 0.9 µm. The angular relationships described in this example are also specifically shown in FIG. 13. Cell 500 is white in the ON state and black in the OFF state.

EXAMPLE 14

In this particular example, lower A-film 539 is used. Angle 651 is about 50°, angle 652 is about 90°, twist angle 653 is about 200° to the left, angle 654 is about 90° and angle 655 is about 50°. Additionally, $\Delta n \times d$ of both the upper A-film 537 and lower A-film 539 when added together is about 0.6 µm and $\Delta n \times d$ of liquid crystal 542 is about 0.9 µm. Cell 500 is white in the ON state and black in the OFF state.

EXAMPLE 15

$\Delta n \times d$ of upper A-film 537 is about 0.65 µm, angle 651 is about 50°, angle 652 is about 90°, twist angle 653 is about 250° to the left and angle 656 is about 50°. Liquid crystal 542 has a $\Delta n \times d$ of about 0.9 µm. Cell 500 is white in the ON state and black in the OFF state.

EXAMPLE 16

Upper A-film 537 includes eleven films of optical anisotropic material whose optical axes are twisted to the right by 15° as viewed from top to bottom, that is, as viewed toward B-cell 538. The eleven films comprising upper A-film 537 have a $\Delta n \times d$ of about 0.7 µm. Additionally, the direction of polarizing axis 649 of upper polarizer 536 and the optical axis of the uppermost film of upper A-film 537 forms an angle of approximately 50°. The direction of the optical axis of the lowest film of upper A-film 536, that is, the layer of film closest to B-cell 538 and rubbing direction 645 of upper electrode substrate 541 forms an angle of approximately 90°. Angle 653 is about 200° to the left and angle 656 is about 40°. $\Delta n \times d$ of liquid crystal 542 is about 0.9 μm. Cell 500 is white in the ON state and black in the OFF state.

EXAMPLE 17

Upper A-film 537 has a $\Delta n \times d$ of about 0.65 μm to 0.85 μm, angle 651 is between about 35° to 55°, angle 652 is about 80° to 100°, twist angle 653 is about 200° to the left, angle 656 is about 35° to 55° and $\Delta n \times d$ of liquid crystal 542 is about 0.9 μm. Cell 500 is white in the ON state and black in the OFF state.

EXAMPLE 18

Upper A-film 537 has a $\Delta n \times d$ of about 0.25 μm to 0.45 μm, angle 651 is about 35° to 55°, angle 652 is about 80° to 100°, twist angle 653 is about 200° to the left, angle 656 is about 35° to 55° and $\Delta n \times d$ of liquid crystal 542 is about 0.9 μm. Cell 500 is white in the ON state and black in the OFF state.

EXAMPLE 19

Upper A-film 537 has a $\Delta n \times d$ of about 0.4 μm to 0.6 μm, angle 651 is about 35° to 55°, angle 652 is about 80° to 100°, twist angle 653 is about 180° to the left, angle 656 is about 35° to 55° and $\Delta n \times d$ of liquid crystal 542 is about 0.9 μm. Cell 500 is white in the ON state and black in the OFF state.

EXAMPLE 20

Upper A-film 537 has a $\Delta n \times d$ of about 0.5 to 0.7 μm, angle 651 is about 35° to 55°, angle 652 is about 80° to 100°, twist angle 653 is about 180° to the left, angle 656 is about 35° to 55° and $\Delta n \times d$ of liquid crystal 542 is about 1.0 μm. Cell 500 is white in the ON state and black in the OFF state.

EXAMPLE 21

Upper A-film 537 has a $\Delta n \times d$ of about 0.5 to 0.6 μm, angle 651 is about 35° to 55°, angle 652 is about 80° to 100°, twist angle 653 is about 230° to the left, angle 656 is about 35° to 55° and $\Delta n \times d$ of liquid crystal 542 is about 0.9 μm. Cell 500 is white in the ON state and black in the OFF state.

Figure 36:
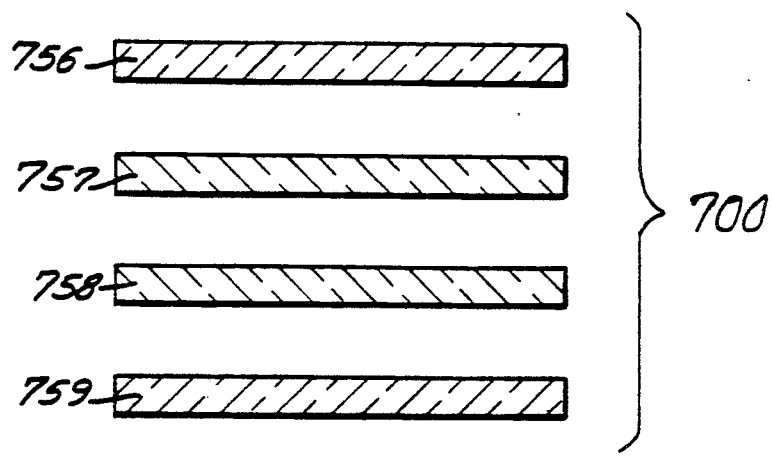
FIG. 36 is an exploded cross-sectional view of a portion of a liquid crystal device in accordance with still another alternative embodiment of the invention.

Although FIG. 34 illustrates upper A-film 537 spaced from upper polarizer 536, upper polarizer 536 and upper A-film 537 can be joined together as one integral unit as shown in FIG. 36. More particularly, protective films 756 and 759 sandwich therebetween a polarizer 757 and an A-film 758. Additionally, a reflector can be provided on the outside of either upper or lower polarizers shown in any of the embodiments described heretofore. Accordingly, a reflective display device providing a monochrome display can be obtained.

As can now be readily appreciated, the invention provides a monochrome display and, in particular, provides a white color in the OFF state and appears black in the ON state.

It will thus be seen that the objects set forth above, and those made apparent from the preceding description, are efficiently attained and, since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A liquid crystal display device, comprising:

twisted nematic liquid crystal display means including a twisted nematic liquid crystal material for producing a colored display and characterized by parameters including a twist angle {TA(B)} and a product of refractive index anisotropy $\Delta n$ and layer thickness d{$\Delta n \times d(B)$}; and compensating means for compensating for color of said display means and characterized by parameters including a twist angle {TA(A)} where the actual value of TA(A)≦500° and a product of refractive index anisotropy $\Delta n$ and layer thickness d{$\Delta n \times d(A)$} where the actual value of $\Delta n \times d(A)$ has a range of 0.2 μm≦$\Delta n \times d(A)$≦1.9 μm;

wherein when the values of the twist angle TA(B) are in the range 120°≦TA(B)<330° and the product $\Delta n \times d(B)$ are in the range 0.3 μm≦$\Delta n \times d(B)$≦1.5 μm of said liquid crystal display means respectively, the actual value of the twist angle TA(A) of the compensating means ranges from the calculated value of TA(A)−40° to the calculated value of TA(A)+40°, the actual value of the product $\Delta n \times d(A)$ of the compensating means ranges from the calculated value of $\Delta n \times d(A)$−0.1 μm to the calculated value of $\Delta n \times d(A)$+0.1 μm, and the calculated values of TA(A) and $\Delta n \times d(A)$ are determined by the following formulas:

calculated $\Delta n \times d(A) = a_1 \times$ (calculated TA(A))$^{-2} + a_2$, where $a_2 = a_3 \times \Delta n \times d(B) + a_4 + 0.275 \times n$ $a_1 = a_5 \times \exp(a_6 \times a_2) \times (1-a_7)$ $a_3 = a_8 \times \exp(a_9 \times TA(B))$ $a_4 = a_{10} \times \exp(a_{11} \times TA(B))$ $a_7 = a_{12} \times \exp(a_{13} \times \Delta n \times d(B))$ where:

$\Delta n \times d(A)$ is $\Delta n \times d$ (in μm) of the compensating means;

TA(A) is the twist angle (in degrees) of the compensating means;

$\Delta n \times d(B)$ is $\Delta n \times d$ (in μm) of the liquid crystal display means;

TA(B) is the value (in degrees) of the twist angle of the liquid crystal display means and is positive;

$a_1$ and $a_5$ have the dimensional units of μm·degrees$^{-2}$;

$a_2$, $a_4$ and $a_{10}$ have the dimensional units of μm;

$a_3$, $a_7$, $a_8$ and $a_{12}$ are unitless;

$a_6$ and $a_{13}$ have the dimensional units of μm$^{-1}$;

$a_9$ and $a_{11}$ have the dimensional units of degrees$^{-1}$;

n is an integer, 0, ±1, ±2, ...; and $a_5 = -2.10 \times 10^{-5}$ $a_6 = -1.07$ $a_8 = 1.08$ $a_9 = -1.12 \times 10^{-3}$ $a_{10} = 8.55 \times 10^{-2}$ $a_{11} = 6.47 \times 10^{-3}$ $a_{12} = 0.50$ $a_{13} = -0.90$.

2. The device of claim 1, wherein the products of refractive index anisotropy of $\Delta n$ and layer thickness of d of the liquid crystal cell means and compensating means differ in value from each other.

3. The device of claim 1, wherein the compensating means includes at least one layer of an optically anisotropic material.

4. The device of claim 3, wherein the liquid crystal material in the compensating means is a super twisted liquid crystal material.

5. The device of claim 1, wherein the compensating means is a nematic liquid crystal cell.

6. The device of claim 1, further including a pair of linear polarizers with one polarizer disposed adjacent to the liquid crystal cell means and the second of said polarizers disposed adjacent to the compensating means whereby incident linearly polarized light passing through the first polarizer becomes an elliptically polarized light by the liquid crystal cell means and enters the compensating means as elliptically polarized light which is converted back to substantially linearly polarized light by the compensating means.

7. The device of claim 1, wherein the values of twist angle TA(A) and product of $\Delta n \times d(A)$ of said compensating means vary within the range of the calculated $TA(A)-20° \leq$ the actual $TA(A) \leq$ the calculated $TA(A)+20$ and the calculated $\Delta n \times d(A)-0.05$ $\mu m \leq$ the actual $\Delta n \times d(A) \leq$ the calculated $\Delta n \times d(A)+0.05$ $\mu m$, respectively.

8. A liquid crystal display device, comprising:

twisted nematic liquid crystal display means including a twisted nematic liquid crystal material for producing a colored display and characterized by parameters including a twist angle $\{TA(B)\}$ and a produce of refractive index anisotropy $\Delta n$ and layer thickness d $\{\Delta n \times d(B)\}$; and compensating means for compensating for color of said display means and characterized by parameters including a twist angle $\{TA(A)\}$ where the actual value of $TA(A) \leq 500°$ and a product of refractive index anisotropy $\Delta n$ and layer thickness d $\{\Delta n \times d(A)\}$ where the actual value of $\Delta n \times d(A)$ has a range of 0.2 $\mu m \leq \Delta n \times d(A) \leq 1.9$ $\mu m$;

wherein when the values of the twist angle TA(B) are in the range $330° \leq TA(B) \leq 480°$ and the produce of $\Delta n \times d(B)$ are in the range 0.3 $\mu m \leq \Delta n \times d(B) \leq 1.5$ $\mu m$ of said liquid crystal display means, respectively, the actual value of the twist angle TA(A) of the compensating means ranges from the calculated value of $TA(A)-40°$ to the calculated value of $TA(A)+40°$, the actual value of the product $\Delta n \times d(A)$ of the compensating means ranges from the calculated value of $\Delta n \times d(A)-0.1$ $\mu m$ to the calculated value of $\Delta n \times d(A)+0.1$ $\mu m$, and the calculated values of TA(A) and $\Delta n \times d(A)$ are determined by the following formulas:

calculated $\Delta n \times d(A) = a_1 \times$ (calculated $TA(A))^{-2} + a_2$ $a_2 = a_3 \times \Delta n \times d(B) + a_4 + 0.275 \times n$ $a_1 = a_5 \times \exp(a_6 \times a_2) \times (1-a_7) \times a_{14}$ $a_3 = a_8 \times \exp(a_9 \times TA(B))$ $a_4 = a_{10} \times \exp(a_{11} \times TA(B))$ $a_7 = a_{12} \times \exp(a_{13} \times \Delta n \times d(B))$ $a_{14} = a_{15} \times \exp(a_{16} \times TA(B))$ where:

$\Delta n \times d(A)$ is $\Delta n \times d$ (in $\mu m$) of the compensating means;

TA(A) is twist angle (in degrees) of the compensating means;

$\Delta n \times d(B)$ is $\Delta n \times d$ (in $\mu m$) of the liquid crystal display means;

TA(B) is the value (in degrees) of the twist angle of the liquid crystal display means and is positive;

$a_1$ and $a_5$ have the dimensional units of $\mu m \cdot$degrees$^{-2}$;

$a_2$, $a_4$ and $a_{10}$ have the dimensional units of $\mu m$;

$a_3$, $a_7$, $a_8$, $a_{12}$, $a_{14}$ and $a_{15}$ are unitless;

$a_6$ and $a_{13}$ have the dimensional units of $\mu m^{-1}$;

$a_9$, $a_{11}$ and $a_{16}$ have the dimensional units of degrees$^{-1}$;

$a_5 = -2.10 \times 10^{-5}$ $a_6 = -1.07$ $a_8 = 1.08$ $a_9 = -1.12 \times 10^{-3}$ $a_{10} = 8.55 \times 10^{-2}$ $a_{11} = 6.47 \times 10^{-3}$ $a_{12} = 0.50$ $a_{13} = -0.90$ $a_{15} = 2.50 \times 10^{-2}$ $a_{16} = 1.13 \times 10^{-2}$ 9. The device of claim 8, wherein the products of refractive index anisotropy of $\Delta n$ and layer thickness d of the liquid crystal cell means and compensating means differ in values from each other.

10. The device of claim 8, wherein the compensating means includes at least one layer of an optically anisotropic material.

11. The device of claim 10, wherein the liquid crystal material in the compensating means is a super twisted liquid crystal material.

12. The device of claim 8, wherein the compensating means is a nematic liquid crystal cell.

13. The device of claim 8, further including a pair of linear polarizers with one polarizer disposed adjacent to the liquid crystal cell means and the second of said polarizers disposed adjacent to the compensating means whereby incident linear polarized light passing through the first polarizer becomes an elliptically polarized light by the liquid crystal cell means and enters the compensating means as elliptically polarized light which is converted back to linearly polarized light by the compensating means.

14. The device of claim 8, wherein the values of twist angle TA(A) and product of $\Delta n \times d(A)$ of said compensating means vary within the range of the calculated $TA(A)-20° \leq$ the actual $TA(A) \leq$ the calculated $TA(A)+20°$ and the calculated $\Delta n \times d(A)-0.05$ $\mu m \leq$ the actual $\Delta n \times d(A) \leq$ the calculated $\Delta n \times d(A)+0.05$ $\mu m$, respectively.

* * * * *